(12) United States Patent
Kishigami et al.

(10) Patent No.: US 9,097,791 B2
(45) Date of Patent: Aug. 4, 2015

(54) RADAR DEVICE

(75) Inventors: Takaaki Kishigami, Tokyo (JP); Hirohito Mukai, Tokyo (JP); Yoichi Nakagawa, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 274 days.

(21) Appl. No.: 13/807,189

(22) PCT Filed: Jul. 1, 2011

(86) PCT No.: PCT/JP2011/003786
§ 371 (c)(1),
(2), (4) Date: Dec. 27, 2012

(87) PCT Pub. No.: WO2012/008110
PCT Pub. Date: Jan. 19, 2012

(65) Prior Publication Data
US 2013/0113653 A1 May 9, 2013

(30) Foreign Application Priority Data
Jul. 16, 2010 (JP) .................................. 2010-161799

(51) Int. Cl.
*G01S 13/08* (2006.01)
*G01S 7/35* (2006.01)
(Continued)

(52) U.S. Cl.
CPC . *G01S 7/35* (2013.01); *G01S 7/285* (2013.01); *G01S 7/4021* (2013.01); *G01S 13/42* (2013.01); *G01S 13/931* (2013.01)

(58) Field of Classification Search
CPC ......... G01S 7/35; G01S 13/42; G01S 13/931; G01S 7/285; G01S 7/4021

USPC .................................................. 342/189, 202
See application file for complete search history.

(56) References Cited

U.S. PATENT DOCUMENTS 5,381,153 A 1/1995 Saito et al.
5,910,118 A * 6/1999 Kanda et al. ................... 600/455
(Continued)

FOREIGN PATENT DOCUMENTS

CN 2775679 Y 4/2006
JP 62-32379 A 2/1987
(Continued)

OTHER PUBLICATIONS

Chinese Office Action, dated Nov. 5, 2013, for corresponding Chinese application No. 201180031699.2, 12 pages.
(Continued)

*Primary Examiner* — Timothy A Brainard
(74) *Attorney, Agent, or Firm* — Seed IP Law Group PLLC

(57) ABSTRACT

The disclosed technique includes transmitting a signal intermittently according to a transmission cycle having a predetermined transmission period and a non-transmission period; receiving the signal reflected from a target with reception antennas; and detecting the target from the reflected signal. A high-frequency transmission signal attenuated during the transmission period and a receipt signal received during the non-transmission period are combined together. A correlation value between a reference transmission signal and the receipt signal in the combined signal is calculated, and the amount of phase shift in an arbitrarily selected reception antenna is calculated from the correlation value of a reference reception antenna, and the correlation values of the other reception antennas. The phase component of the correlation value of the arbitrarily selected reception antenna is corrected on the basis of the amount of phase shift.

13 Claims, 13 Drawing Sheets

(51) Int. Cl.
*G01S 7/285* (2006.01)
*G01S 7/40* (2006.01)
*G01S 13/42* (2006.01)
*G01S 13/93* (2006.01)

(56) References Cited

U.S. PATENT DOCUMENTS

| | | | |
|---|---|---|---|
| 6,922,450 | B2 | 7/2005 | Yuda et al. |
| 2007/0194925 | A1* | 8/2007 | Karr .................... 340/572.1 |

FOREIGN PATENT DOCUMENTS

| | | |
|---|---|---|
| JP | 6-34751 A | 2/1994 |
| JP | 6-317654 A | 11/1994 |
| JP | 7-191131 A | 7/1995 |
| JP | 10-170633 A | 6/1998 |
| JP | 2981312 B2 | 11/1999 |
| JP | 2006-258644 A | 9/2006 |
| JP | 2009-31185 A | 2/2009 |
| JP | 2009-294071 A | 12/2009 |

OTHER PUBLICATIONS

Cadzow, "Direction-of-Arrival Estimation Using Signal Subspace Modeling," IEEE Transactions on Aerospace and Electronic Systems 28(1): 64-79, 1992.
International Search Report, mailed Sep. 27, 2011, for International Application No. PCT/JP2011/003786, 7 pages.
Yamano et al., "76GHz Millimeter Wave Automobile Radar using Single Chip MMIC," Fujitsu Ten Tech J. 23: 12-19, 2004.

* cited by examiner

RADAR DEVICE

TECHNICAL FIELD

The present invention relates to a radar device which sequentially receives a signal obtained due to reflection by a target, by a plurality of antennas.

BACKGROUND ART

A radar device radiates radio waves from a point of measurement to space and receives a signal reflected from a target to thereby measure a distance, a direction, etc. from the point of measurement to the target. Development of a radar device capable of detecting not only a car but also a pedestrian or the like as a target by high-resolution measurement using short-wavelength radio waves such as microwaves or millimeter waves has advanced in recent years.

Generally, in a radar device, long-wavelength radio waves are so low in attenuation as to make detection of a distant place possible but are so low in resolution as to make accuracy of target detection low. On the contrary, short-wavelength radio waves are so high in attenuation as to make detection of a distant place difficult because of easy absorption or reflection by water vapor, cloud, rain, etc. contained in air but are so high in resolution as to make accuracy of target detection high. Radar devices disclosed in the following Non-Patent Literature and Patent Literature are known as conventional radar devices.

For example, Non-Patent Literature 1 has disclosed a radar device which scans an antenna mechanically and scans pulse waves or continuous waves electronically with a narrow-angle directional beam to thereby transmit radio waves and receive reflection waves reflected from a target. In the radar device according to Non-Patent Literature 1, the antenna scanning time is required for detecting the target because a single antenna is used for transmission/reception of radio waves.

For example, when a target moving at a high speed is to be detected, it is therefore difficult to detect the target while following the movement of the target because of the necessity of a lot of scans in accordance with required high-resolution measurement.

Non-Patent Literature 2 has disclosed a radar device in which a signal reflected from a target is received by a plurality of antennas disposed spatially and the phase of the received signal is measured without the necessity of a lot of scans so that an arrival angle is estimated with higher resolution than the directivity of each antenna though the beam directivity of each antenna is relatively wide.

According to the radar device of Non-Patent Literature 2, the arrival angle can be estimated by signal processing at thinned-out scanning intervals to thereby improve accuracy of target detection compared with the radar device of Non-Patent Literature 1. Moreover, even when the target is moving at a high speed, the arrival angle can be estimated following the movement of the target.

In Non-Patent literature 2, because a plurality of antennas are however used so that an RF (Radio Frequency) generator for amplifying a signal received by each antenna and down-converting the frequency of the signal to generate a baseband signal and a signal processor for applying A/D (Analog Digital) conversion to the generated baseband signal to calculate a desired arrival angle are provided in accordance with each antenna, the overall configuration of the receiver is complicated and a cost increase is brought.

Patent Literature 1 has disclosed a radar device and a target detecting method in which a switch for selecting one of antennas is provided so that a single transmitter and a single receiver can detect a target while the antenna receiving reflected waves from a target is sequentially selected by the switch. According to Patent Literature 1, simplification in configuration of the radar device can be attained because it is unnecessary to provide the RF generator and the signal processor in the Non-Patent Literature 2 in accordance with each antenna.

However, in Patent Literature 1, to correct a phase shift quantity generated by temporal change of operation in each of the transmitter and the receiver is unconsidered. The phase shift quantity generated by the temporal change is a variable phase shift quantity caused by temporal operation of a local oscillator provided in each of the transmitter and the receiver.

Accordingly, in the configuration of Patent Literature 1, a VCO (Voltage Controlled Oscillator) is connected only to the transmitter even if a reference signal is used in common for driving the local oscillators in the transmitter and the receiver. For this reason, PLL (Phase Locked Loop) circuits provided in the local oscillators respectively operate independently, so that a variable phase shift quantity is caused by temporal operation in between the transmitter and the receiver.

The arrival angle of the target is estimated on the condition that a phase difference dependent on the arrival angle of reflected waves from the target exists between antennas disposed in different positions. For this reason, when a phase shift quantity varying temporally is generated in each sequentially selected antenna and mixed with the signal received by the antenna, accuracy of phase detection according to each antenna deteriorates so that accuracy of target measurement deteriorates.

Moreover, Patent Literature 2 has disclosed a phase calibration device of an active phased array radar which switches a transmission signal as an input signal through a directional coupler and inputs the signal to the reception side as a reference signal in phase calibration.

However, in Patent Literature 2, because a process of distributing a part of the transmission signal through the directional coupler and inputting it to the reception side is performed by a switch, it is necessary to use the switch to notify the reception side of the output timing of the transmission signal whenever the transmission signal is transmitted. As a result, the process applied to the switch is complicated so that the overall configuration of the device is complicated.

However, in a configuration that a mechanism of inputting a part of the transmission signal to the reception side through the directional coupler in Patent Literature 2 is provided between the transmitter and the receiver in Patent Literature 1, a phase shift quantity temporally generated between the transmitter and the receiver can be measured by transmitting an attenuated signal of the transmission signal to the receiver even when the phase shift quantity is generated. Accordingly, there is an inference that deterioration of estimation accuracy of the arrival angle of the target can be reduced to some degree by correcting the measured phase shift quantity.

For example, when a calibration time is provided before a measurement time of a certain radar so that the phase shift quantity is measured in the calibration time, an actually measured phase difference between the transmitter and the receiver can be corrected in a measurement time of an actual radar device based on the phase shift quantity measured in the calibration time.

CITATION LIST

Patent Literature

Patent Literature 1: JP-A-2009-031185
Patent Literature 2: JP-A-10-170633

Non-Patent Literature

Non-Patent Literature 1: Shinichi Yamano and other six persons., "76 GHz Millimeter Wave Automobile Radar Using Single Chip MMIC", Fujitsu Ten Tech. J. Vol. 22, No. 1, pp. 12-19 (June 2004)

Non-Patent Literature 2: JAMES A. Cadzow, "Direction of Arrival Estimation Using Signal Subspace Modeling", IEEE, Vol. 28, pp. 64-79 (1992)

SUMMARY OF INVENTION

Technical Problem

However, when a mechanism in which a part of the transmission signal in Patent Literature 2 is input to the reception side through a directional coupler is provided between the transmitter and the receiver in Patent Literature 1, it is necessary to add a port for the calibration to the switch separately. For this reason, there is a problem that both circuit configurations of the transmitter and the receiver are complicated, and that attenuation of the reception signal increases.

Moreover, because it is necessary to provide calibration time separately in addition to the measurement time in the radar device, there is a problem that the time allowed to be used for measurement as the radar decreases. On the other hand, when cyclic and continuous measurement is designed between the respective antennas inclusive of the calibration time, the measurement time in any one of the antennas is decreased. As a result, there is a problem that the measurement distance range in the antenna decreases.

These problems will be described with reference to FIG. 10. FIG. 10 shows timing charts in the case where calibration is performed after reception by each antenna in a conventional radar device. In FIG. 10, (a) and (c) show timing charts of pulse signals which are transmission signals. In FIG. 10, (b) and (d) show states where a phase shift quantity measurement time for calibration is provided after measurement by each antenna.

In FIG. 10, assume that Tr [sec] is the transmission cycle of the pulse signal, Tw [sec] is the transmission period of the pulse signal, and P [dB] is the transmission power of the pulse signal. The port of the switch is changed over to an antenna ANT1 while a pulse signal is transmitted between time $t_0$ and time $t_1$, so that measurement by the antenna ANT1 is performed between time $t_1$ and $t_2$. The port of the switch is changed over to an antenna ANT2 while a pulse signal is transmitted between time $t_2$ and time $t_3$, so that measurement by the antenna ANT2 is performed between time $t_3$ and time $t_4$.

The port of the switch is changed over to an antenna ANT3 while a pulse signal is transmitted between time $t_4$ and time $t_5$, so that measurement by the antenna ANT3 is performed between time $t_5$ and time $t_6$. Similarly, the port of the switch is changed over to an antenna ANT4 while a pulse signal is transmitted between time $t_6$ and time $t_7$, so that measurement by the antenna ANT4 is performed between time $t_7$ and time $t_8$.

The port of the switch is changed over to a port for calibration between time $t_8$ and time $t_9$, so that calibration is performed between time $t_9$ and time $t_{10}$. The port of the switch is changed over to the antenna ANT1 in the manner between time $t_{11}$ ad time $t_{12}$, and then the same processing is repeated.

In (b) in FIG. 10, measurement is performed with an equal measurement time by each of the antennas ANT1 to ANT4. However, a calibration period of time $t_8$-$t_{10}$ is provided before the transmission time $t_{11}$ of the pulse signal which will be measured by the antenna ANT1 continuously after the antenna ANT4.

The calibration period represented by time $t_8$-$t_{10}$ is a period which is the sum of a period (time $t_8$-$t_9$) for changing the port of the switch over to the calibration port for performing calibration and a calibration execution period (time $t_9$-$t_{10}$). Because the calibration period is added as the phase shift quantity measurement time, the time allowed to be used for measurement as the radar decreases.

In (d) in FIG. 10, measurement is performed with an equal measurement time by each of the antennas ANT1 to ANT3. However, the measurement time in the antenna ANT4 after the antenna ANT3 is shorter by the calibration period than the measurement time in the other antennas ANT1 to ANT3. That is, the sum of the measurement period (of time $t_7$-$t_8$) in the antenna ANT4 and the calibration period (of time $t_8$-$t_{10}$) is equal to the measurement time in the other antennas ANT1 to ANT3.

Accordingly, in the radar device using a plurality of antennas for performing measurement, when the measurement time in a certain antenna is shorter than the measurement time in any of the other antennas, the measurable distance range in that certain antenna becomes narrow. For this reason, as shown in (d) in FIG. 10, the measurable distance in the antenna ANT4 becomes shorter than those in the other antennas ANT1 to ANT3.

The invention is accomplished in consideration of the circumstances in the background art. An object of the invention is to provide a radar device which suppresses deterioration of accuracy in estimation of an arrival angle of a target in such a correction manner that a phase shift quantity of a phase component in a correlation value between a reception signal received by each of reception antennas and a transmission signal is calculated properly while influence on a measurement time or measurement distance range is suppressed.

Solution to Problem

According to the invention, there is provided the radar device which is a radar device for transmitting a high-frequency transmission signal intermittently in a transmission cycle having a predetermined transmission period and a non-transmission period, receiving a signal reflected by a target by using a plurality of reception antennas, and detecting the target based on the reflected signal, the radar device including: a transmission signal generator which generates a transmission signal in baseband; a RF transmitter which converts the transmission signal generated by the transmission signal generator into a high-frequency transmission signal; a directional coupler which distributes the high-frequency transmission signal converted by the RF transmitter in accordance with a predetermined signal power ratio; a level adjuster which adjusts the high-frequency transmission signal distributed by the directional coupler to a predetermined level; a signal combiner which combines a signal output from the level adjuster and a reception signal received by the reception antennas; a RF receiver which converts the signal combined by the signal combiner into a reception signal in the baseband; a reference transmission signal generator which generates a reference transmission signal the same as the transmission signal generated by the transmission signal generator; a correlation value calculator which calculates a correlation value between the reference transmission signal generated by the reference transmission signal generator and the reception signal converted by the RF receiver; a phase shift quantity calculator which calculates a phase shift quantity in arbitrary one of the reception antennas based on the correlation value in a reference reception antenna which is specific one of the reception antennas, and the correlation value in any one of the other reception antennas; and a phase corrector which corrects a phase component of the correlation value in the arbitrary reception antenna based on the phase shift quantity calculated by the phase shift quantity calculator.

Advantageous Effects of Invention

According to the radar device according to the invention, deterioration of accuracy in estimation of an arrival angle of a target in such a correction manner that a phase shift quantity of a phase component in a correlation value between a reception signal received by each of reception antennas and a transmission signal is calculated properly while influence on a measurement time or measurement distance range is suppressed.

DESCRIPTION OF EMBODIMENTS

Respective embodiments of the invention will be described below with reference to the drawings. Although a radar device according to each of the following embodiments will be described in the case where a single pulse signal is used as an example of a transmission signal, the transmission signal is not limited to the single pulse signal. In the following description, a reception signal received by the radar device is a signal combined from a signal after a high-frequency transmission signal from the radar device is reflected by a target, and a noise signal around the radar device. Incidentally, signal power of the noise signal around the radar device is negligibly lower than the signal power of the signal reflected by the target.

[First Embodiment]

Figure 1:
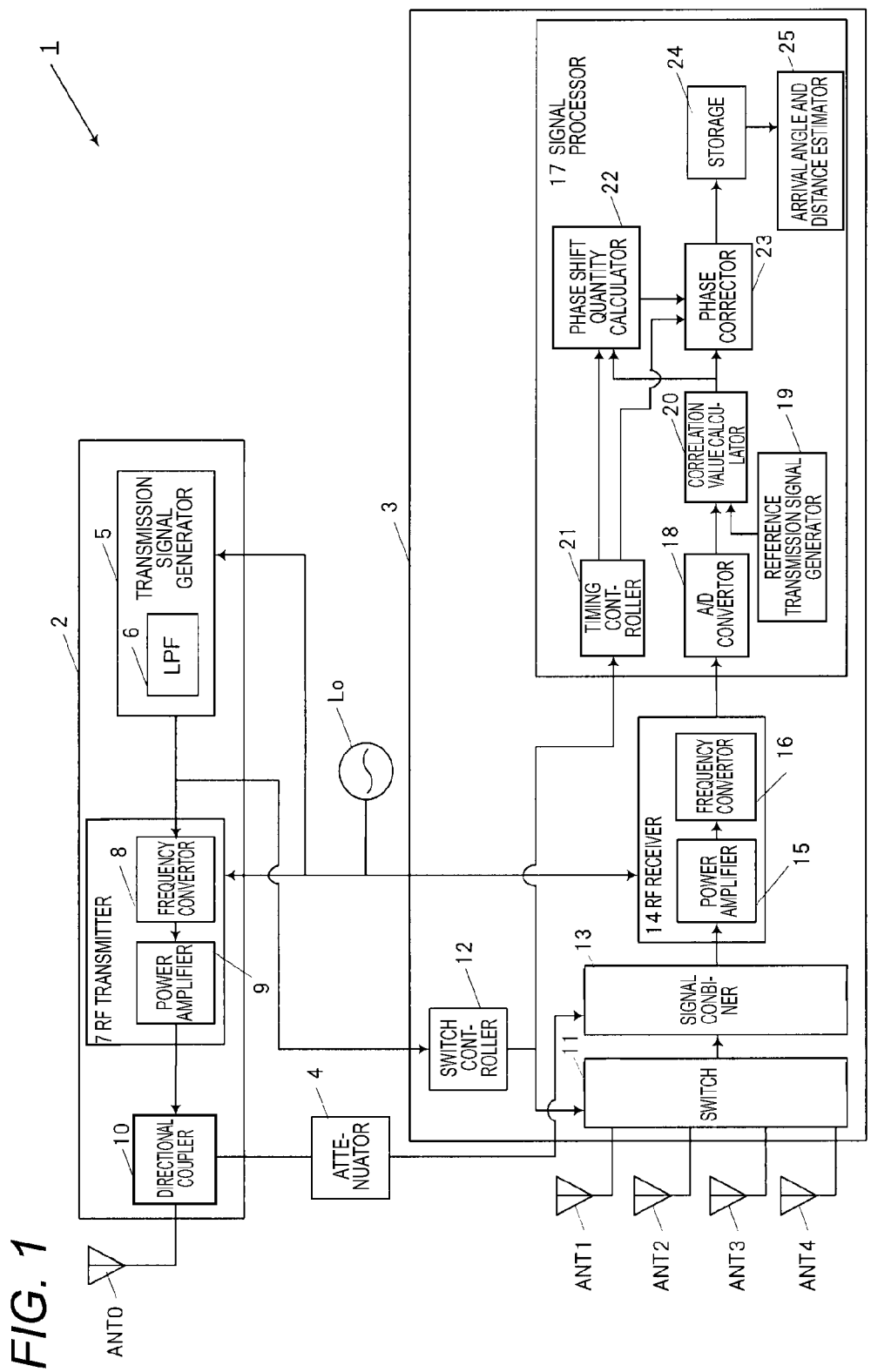
[FIG. 1] A block diagram illustrating the internal configuration of a radar device according to a first embodiment.

The configuration and operation of a radar device 1 according to a first embodiment will be described with reference to FIGS. 1 and 2. FIG. 1 is a block diagram illustrating the internal configuration of the radar device 1 according to the first embodiment.

Figure 2:
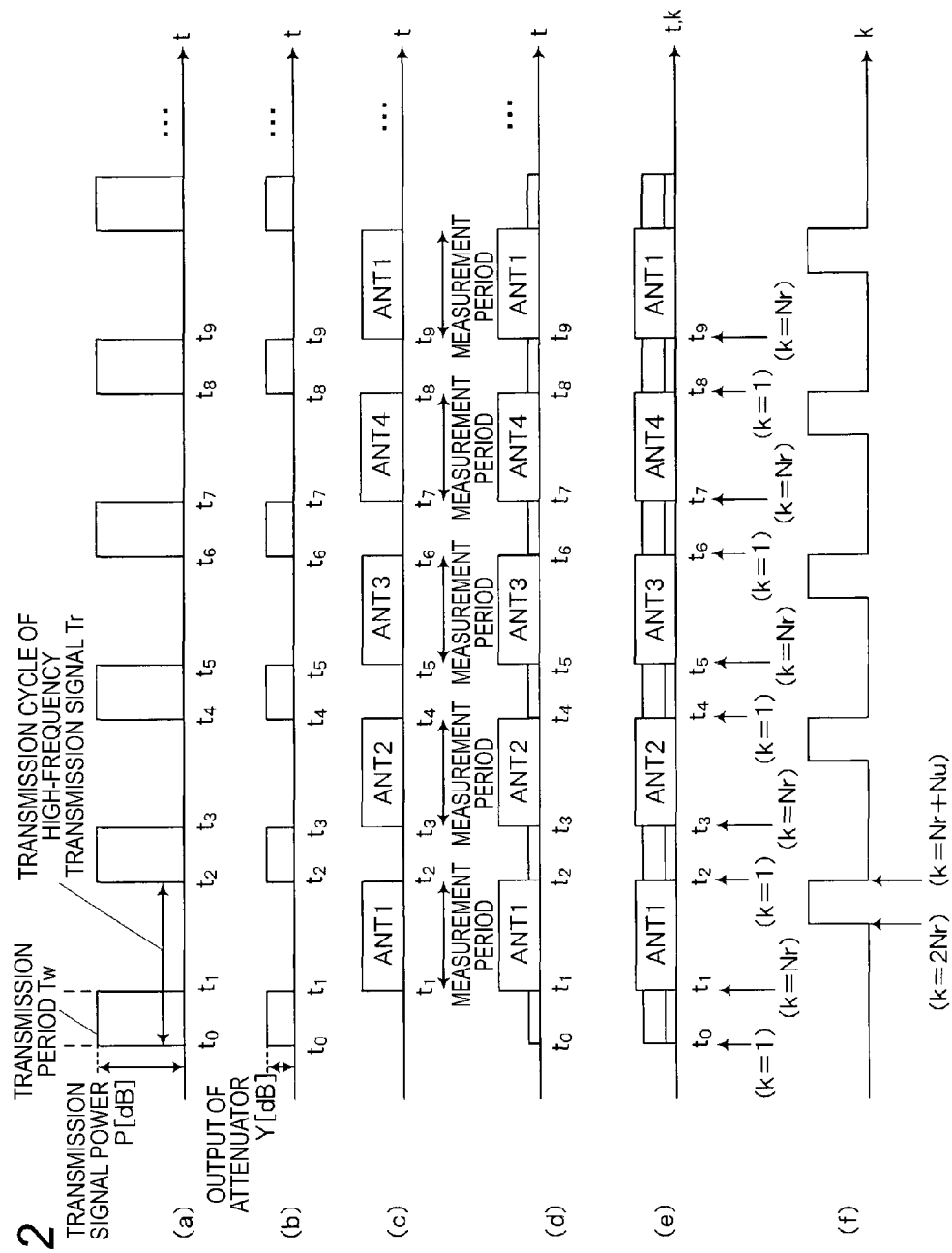
[FIG. 2] A timing chart concerned with operation of the radar device according to the first embodiment, in which (a) is an explanatory view illustrating a timing chart of a high-frequency transmission signal, (b) is an explanatory view illustrating a timing chart of the high-frequency transmission signal input to a signal combiner, (c) is an explanatory view illustrating a period of measurement by each reception antenna, (d) is an explanatory view illustrating an output of a reception signal from a switch and a period of measurement by each antenna, (e) is an explanatory view illustrating an output from the signal combiner, a period of measurement by each reception antenna and a timing for calculating a phase shift quantity, and (f) is an explanatory view illustrating a period for storing a correlation value between a transmission signal and a reception signal.

FIG. 2 is a timing chart concerned with operation of the radar device 1. In FIG. 2, (a) is an explanatory view illustrating a timing chart of a high-frequency transmission signal. In FIG. 2, (b) is an explanatory view illustrating a timing chart of the high-frequency transmission signal input to a signal combiner 13 from an attenuator 4. In FIG. 2, (c) is an explanatory view illustrating a period of measurement by each of reception antennas ANT1 to ANT4. In FIG. 2, (d) is an explanatory view illustrating an output of a reception signal from a switch 11 and a period of measurement by each of the reception antennas ANT1 to ANT4.

In FIG. 2, (e) is an explanatory view illustrating an output from the signal combiner 13, a period of measurement by each of the reception antennas ANT1 to ANT4 and a timing for calculating a phase shift quantity. In FIG. 2, (f) is an explanatory view illustrating a period for storing a correlation value between a transmission signal and a reception signal.

As shown in FIG. 1, the radar device 1 has an oscillator Lo, a radar transmitter 2, a radar receiver 3, a transmission antenna ANT0, reception antennas ANT1 to ANT4, and an attenuator 4. In the radar device 1 according to the first embodiment, a predetermined intermittent high-frequency transmission signal generated by the radar transmitter 2 is transmitted from the transmission antenna ANT0, a signal reflected by a target is received by a reception antenna sequentially selected from the reception antennas ANT1 to ANT4, and the target is detected from the reception signal thus received. Incidentally, the target is an object such as a car or a person to be detected by the radar device 1. The same thing applies to the following embodiments.

The radar transmitter 2 has a transmission signal generator 5, a RF transmitter 7, and a directional coupler 10. Although the transmission signal generator 5 in FIG. 1 is formed to include an LPF (Low Pass Filter) 6, the LPF 6 may be formed independent of the transmission signal generator 5. The RF transmitter 7 has a frequency converter 8, and a power amplifier 9.

The transmission signal generator 5 generates a timing clock based on a reference signal generated by the oscillator Lo so that the reference signal is multiplied by a predetermined number. The transmission signal generator 5 cyclically generates a transmission signal $r(n)$ of a baseband formed from a pulse train having a plurality of pulses based on the generated timing clock. The transmission signal generator 5 outputs a transmission signal $r(n)$ of a predetermined limited band to the RF transmitter 7 through the LPF 6.

Here, the parameter n expresses discrete time. As the transmission signal generated by the transmission signal generator 5, not a continuous signal but a pulse train signal is used. Incidentally, the transmission signal is not limited to the pulse train signal. For example, a single pulse signal or a pulse signal including a plurality of pulse trains or a modulated signal due to frequency modulation or phase modulation of the single pulse signal or the pulse signal including a plurality of pulse trains may be used.

As shown in (a) of FIG. 2, assume that Nr [pieces] of samples are provided as a baseband transmission signal $r(n)$ in a period Tw [sec] of presence of a high-frequency transmission signal transmitted from the transmission antenna ANT0 whereas Nu [pieces] of samples are provided as a baseband transmission signal $r(n)$ in a period (Tr−Tw) [sec] of absence of the high-frequency transmission signal. The parameter Tr is a transmission cycle [sec] of the high-frequency transmission signal transmitted from the transmission antenna ANT0.

The RF transmitter 7 generates a timing clock based on a reference signal generated by the oscillator Lo so that the reference signal is multiplied by a predetermined number. The RF transmitter 7 operates based on the generated reference signal. Specifically, the frequency converter 8 receives as an input a transmission signal $r(n)$ generated by the transmission signal generator 5 and frequency-converts the input baseband transmission signal $r(n)$ to generate a carrier frequency band high-frequency transmission signal. The frequency converter 8 outputs the generated high-frequency transmission signal to the power amplifier 9.

The power amplifier 9 receives the output high-frequency transmission signal, amplifies the signal power of the input high-frequency transmission signal to predetermined signal power P [dB] and outputs the predetermined signal power P [dB] to the transmission antenna ANT0. The amplified high-frequency transmission signal is transmitted so as to be radiated to space through the directional coupler 10 and the transmission antenna ANT0.

The directional coupler 10 outputs the high-frequency transmission signal output from the power amplifier 9 of the RF transmitter 7 to the transmission antenna ANT0, distributes the high-frequency transmission signal in accordance with a predetermined signal power ratio and outputs the distributed high-frequency transmission signal to the attenuator 4.

The transmission antenna ANT0 performs transmission so that the high-frequency transmission signal output from the RF transmitter 7 is radiated to space. As shown in (a) of FIG. 2, the high-frequency transmission signal is transmitted during a period of time $t_0$-$t_1$, during a period $t_2$-$t_3$, during a period of time $t_4$-$t_5$, during a period of time $t_6$-$t_7$ and during a period of time $t_8$-$t_9$ but not transmitted during a period of time $t_1$-$t_2$, during a period of time $t_3$-$t_4$, during a period of time $t_5$-$t_6$ and during a period of time $t_7$-$t_8$. After time $t_9$, transmission of the high-frequency transmission signal is repeated in the same manner.

As shown in (b) of FIG. 2, the attenuator 4 attenuates the signal power of the high-frequency transmission signal output from the directional coupler 10 to predetermined signal power Y [dB] in sync with the transmission period of the high-frequency transmission signal. The attenuator 4 outputs the attenuated high-frequency transmission signal to the signal combiner 13 of the radar receiver 3.

The radar receiver 3 has four reception antennas ANT1 to ANT4, a switch 11, a switch controller 12, a signal combiner 13, a RF receiver 14, and a signal processor 17. The RF receiver 14 has a power amplifier 15, and a frequency converter 16. The signal processor 17 has an A/D converter 18, a reference transmission signal generator 19, a correlation value calculator 20, a timing controller 21, a phase shift quantity calculator 22, a phase corrector 23, a storage 24, and an arrival angle and distance estimator 25.

The reception antennas ANT1 to ANT4 form an array antenna of four reception antennas ANT1 to ANT4. The reception antennas ANT1 to ANT4 receive a signal obtained due to reflection of the high-frequency transmission signal transmitted from the radar transmitter 2 by a target and a noise signal around the radar device 1 as a reception signal. Although description will be made in the case where the number of elements of the array antenna in the radar device 1 according to the first embodiment is 4 as shown in FIG. 1, the number of elements of the array antenna is not limited to 4.

The switch 11 is provided with switching ports corresponding to the reception antennas ANT1 to ANT4 so that the switch 11 is connected to the four reception antennas ANT1 to ANT4.

In the switch 11, the respective switching ports corresponding to the four reception antennas ANT1 to ANT4 are changed sequentially under control of the switch controller 12. By this change, a single switching port is selected so that the switch 11 is connected to a reception antenna ANTs corresponding to the switching port. The parameter s satisfies s=1 to 4. The switch 11 outputs a reception signal received by the selected reception antenna ANTs to the signal combiner 13.

The switch controller 12 controls the switch 11 so that the four reception antennas ANT1 to ANT4 are changed sequentially in a cycle of an integer multiple N (N: integer) of the transmission cycle Tr [sec] of the high-frequency transmission signal. In the first embodiment, as shown in (c) of FIG. 2, the switch controller 12 controls the switch 11 so that the four reception antennas ANT1 to ANT4 are changed sequentially in the same cycle (N=1) as the transmission cycle Tr [sec] of the high-frequency transmission signal.

Specifically, as shown in (c) of FIG. 2, the switch controller 12 selects the reception antenna ANT1 during a period of time $t_0$-$t_1$. Moreover, the switch controller 12 controls the switch 11 so that a reception signal received by the reception antenna ANT1 is output to the signal combiner 13 during a period of time $t_1$-$t_2$. Incidentally, the period of time $t_1$-$t_2$ is a measurement period in which a signal is received by the reception antenna ANT1 (parameter s=1).

The switch controller 12 selects the reception antenna ANT2 during a period of time $t_2$-$t_3$. Moreover, the switch controller 12 controls the switch 11 so that a reception signal received by the reception antenna ANT2 is output to the signal combiner 13 during a period of time $t_3$-$t_4$. Incidentally, the period of time $t_3$-$t_4$ is a measurement period in which a signal is received by the reception antenna ANT2 (parameter s=2).

The switch controller 12 selects the reception antenna ANT3 during a period of time $t_5$-$t_6$. Moreover, the switch controller 12 controls the switch 11 so that a reception signal received by the reception antenna ANT3 is output to the signal combiner 13 during a period of time $t_4$-$t_5$. Incidentally, the period of time $t_5$-$t_6$ is a measurement period in which a signal is received by the reception antenna ANT3 (parameter s=3).

The switch controller 12 selects the reception antenna ANT4 during a period of time $t_6$-$t_7$. Moreover, the switch controller 12 controls the switch 11 so that a reception signal received by the reception antenna ANT4 is output to the signal combiner 13 during a period of time $t_7$-$t_8$. Incidentally, the period of time $t_7$-$t_8$ is a measurement period in which a signal is received by the reception antenna ANT4 (parameter s=4).

Incidentally, as shown in (d) of FIG. 2, the reception signal output from the switch 11 in each of periods of times $t_0$-$t_1$, $t_2$-$t_3$, $t_4$-$t_5$, $t_6$-$t_7$ and $t_8$-$t_9$ is a noise signal around the radar device 1.

The reception signal output from the switch 11 in each of periods of times $t_1$-$t_2$, $t_3$-$t_4$, $t_5$-$t_6$ and $t_7$-$t_8$ is a signal combined from the noise signal and a reception signal (not shown) corresponding to each of the measurement periods (of times $t_1$-$t_2$, $t_3$-$t_4$, $t_5$-$t_6$ and $t_7$-$t_8$). However, the noise signal is negligibly lower than the reception signal. The same thing applies to the following embodiments.

The signal combiner 13 combines a signal from the high-frequency transmission signal output from the attenuator 4 and the reception signal output from the switch 11, and outputs the combined signal to the power amplifier 15 of the RF receiver 14. Here, when the average signal power of the reception signal output from the switch 11 is Z [dB], the signal power of the combined signal output from the signal combiner 13 is (Y+Z) [dB].

Incidentally, it is preferable that the signal power Y [dB] of the high-frequency transmission signal output from the attenuator 4 is attenuated so as to be sufficiently higher (e.g. 3 [dB] to 10 [dB]) than the signal power received by the reception antenna ANTs in a period (of e.g. time $t_0$-$t_1$ etc.) in which the switch controller 12 changes the switching port of the switch 11.

When there are side lobes in autocorrelation characteristic of the high-frequency transmission signal, it is preferable that the attenuator 4 attenuates the signal power of the high-frequency transmission signal output from the directional coupler 10 to such signal power that the level of the side lobes has no influence on the measurement period of the radar device 1.

Moreover, it is preferable that the timing in which the high-frequency transmission signal attenuated by the attenuator 4 is combined by the signal combiner 13 is synchronized with the transmission cycle Tw [sec] of the high-frequency transmission signal transmitted from the radar transmitter 2 and is kept without any time lag. The same thing applies to the following embodiments.

As shown in (e) of FIG. 2, the combined signal output from the signal combiner 13 in each of periods of times $t_0$-$t_1$, $t_2$-$t_3$, $t_4$-$t_5$, $t_6$-$t_7$ and $t_8$-$t_9$ is a signal combined from a noise signal around the radar device 1 and the high-frequency transmission signal output from the attenuator 4.

On the other hand, the combined signal output from the signal combiner 13 in each of periods of times $t_1$-$t_2$, $t_3$-$t_4$, $t_5$-$t_6$ and $t_7$-$t_8$ is a signal combined from the noise signal and a reception signal (not shown) corresponding to each of measurement periods (of times $t_1$-$t_2$, $t_3$-$t_4$, $t_5$-$t_6$ and $t_7$-$t_8$).

The RF receiver 14 generates a timing clock based on a reference signal generated by the oscillator Lo so that the reference signal is multiplied by a predetermined number. The RF receiver 14 operates based on the generated timing clock. Specifically, the power amplifier 15 receives as an input the combined signal combined by the signal combiner 13, amplifies the signal power of the input combined signal to predetermined signal power, and outputs the combined signal to the frequency converter 16.

The frequency converter 16 receives as an input the combined signal output from the power amplifier 15, frequency-converts the input combined signal and phase-shifts the phase component of part of the combined signal by 90 [degrees] based on quadrature detection to thereby generate a baseband reception signal composed of an in-phase signal and a quadrature signal. The frequency converter 16 outputs the generated reception signal to the signal processor 17.

The A/D converter 18 performs sampling at discrete time k for the baseband reception signal composed of the in-phase signal and the quadrature signal generated by the frequency converter 16 to thereby convert the reception signal into digital data.

Here, the reception signal at discrete time k in the reception antenna ANTs is expressed as a complex signal of a complex number x(s,k)=I(s,k)+jQ(s,k) in which I(s,k) is the in-phase signal of the reception signal and Q(s,k) is the quadrature signal of the reception signal. Incidentally, the parameter j is an imaginary unit.

Moreover, the parameter k expresses discrete time corresponding to the number of samples of the baseband transmission signal r(n) included in the high-frequency transmission signal. In the first embodiment, the timing of switching to the reception antenna ANTs is set at k=1 and at k=1 to (Nr+Nu). Accordingly, as shown in (e) of FIG. 2, the parameter k satisfies k=1 at the timing of time $t_0$, time $t_2$, time $t_4$, time $t_6$ and time $t_8$. In addition, the parameter k satisfies k=Nr at the timing of time $t_1$, time $t_3$, time $t_5$, time $t_7$ and time $t_9$.

The reference transmission signal generator 19 generates a timing clock based on a reference signal generated by the oscillator Lo in the same manner as the transmission signal generator 5 in sync with the operation of the transmission signal generator 5 so that the reference signal is multiplied by a predetermined number. The reference transmission signal generator 19 cyclically generates a reference transmission signal r(n) of the same baseband as the transmission signal generated by the transmission signal generator 5, based on the generated reference signal. The reference transmission signal generator 19 outputs the generated reference transmission signal r(n) to the correlation value calculator 20.

The correlation value calculator 20 calculates a correlation value AC(s,k) between the complex signal x(s,k) of the reception signal received by the reception antenna ANTs and the reference transmission signal r(n) output from the reference transmission signal generator 19. Assume now that a sliding correlation value as represented by the expression (1) is calculated as the correlation value.

The sliding correlation value AC(s,k) is a correlation value at discrete time k between the reception signal (including a reflected signal and a noise signal) received by the reception antenna ANTs and the reference transmission signal. The asterisk (*) in the expression (1) expresses a complex conjugate operator. The sliding correlation value AC(s,k) is calculated in periods at k=1 to (Nr+Nu). That is, the sliding correlation value AC(s,k) is calculated in periods of times $t_0$-$t_2$, $t_2$-$t_4$, $t_4$-$t_6$, $t_6$-$t_8$, etc.

[Expression 1]

$$AC(s, k) = \sum_{m=1}^{Nr} x(s, k + m - 1) r^*(m) \qquad (1)$$

Incidentally, when the transmission signal generated by the transmission signal generator 5 is a baseband signal r(n) composed of real numbers, the signal r(n) is used as the reference transmission signal in the calculation of the sliding correlation value AC(s,k). On the other hand, when the transmission signal generated by the transmission signal generator 5 is a baseband signal r(n) composed of an in-phase signal and a quadrature signal, a complex conjugate value of the signal r(n) is used.

The timing controller 21 regards the timing $k_0$ of completion of the period Tw [sec] (transmission period) of presence of the high-frequency transmission signal transmitted from the transmission antenna ANT0 as the timing of completion of calculation of the sliding correlation value AC(s,$k_0$) by the correlation value calculator 20, and notifies the phase shift quantity calculator 22 of the timing information of completion of calculation of the sliding correlation value AC(s,$k_0$).

As shown in (c) and (e) of FIG. 2, the timing $k_0$ of completion of the period Tw [sec] of presence of the high-frequency transmission signal transmitted from the transmission antenna ANT0 and the timing of completion of calculation of the sliding correlation value AC(s,$k_0$) by the correlation value calculator 20 are the same times as the times $t_1$, $t_3$, $t_5$, $t_7$ and $t_9$ and correspond to discrete time $k_0$=Nr.

The timing controller 21 notifies the phase corrector 23 of the timing information for indicating that the sliding correlation value AC(s,k) corrected by the phase corrector 23 is stored in the storage 24 with respect to the sliding correlation value AC(s,k) between the complex signal x(s,k) of the reception signal received by the reception antenna ANTs and the reference transmission signal r(n) output from the reference transmission signal generator 19. However, discrete time k satisfies k=2Nr to (Nr+Nu) (see (f) of FIG. 2).

Incidentally, the discrete time k can be also set in a range of k=(Nr+1) to (Nr+Nu). However, the start timing of discrete time k at which the sliding correlation value AC(s,k) is stored in the storage 24 is determined in the timing controller 21 not at k=Kr but at k=2Nr on the assumption that not a target nearest to the radar device 1 but a target at a predetermined distance [m] or farther from the radar device 1 is detected.

Accordingly, because it is not necessary to consider that the intensive reception level is received from a target nearest to the radar device 1 without distortion, the dynamic range in the radar receiver 3 of the radar device 1 can be reduced. With respect to the start timing of discrete time k at which the sliding correlation value AC(s,k) is stored in the storage 24, in the timing controller 21, the same thing applies to the flowing embodiments.

The phase shift quantity calculator 22 extracts a sliding correlation value AC(s,Nr) in the reception antenna ANTs and a sliding correlation value AC($s_0$,Nr) in the reference reception antenna ANTs$_0$ (which will be described later) based on the timing information given from the timing controller 21 for indicating the completion of calculation of the sliding correlation value.

Here, a reception antenna ANTs$_0$ which is one of the four reception antennas ANT1 to ANT4 shown in FIG. 1 and which is provided as a reference for calculating a phase shift quantity is referred to as reference reception antenna. Assume further that the sliding correlation value AC($s_0$,Nr) in the reference reception antenna ANTs$_0$ and the sliding correlation value AC(s,Nr) in the reception antenna ANTs have been already calculated by the correlation value calculator 20.

The phase shift quantity calculator 22 calculates a phase shift quantity Δθ(s) in the reception antenna ANTs in accordance with the expression (2) based on the sliding correlation value AC(s,Nr) in the reception antenna ANTs and the sliding correlation value AC($s_0$,Nr) in the reference reception antenna ANTs$_0$. The phase shift quantity calculator 22 outputs the calculated phase shift quantity Δθ(s) to the phase corrector 23.

[Expression 2]

$$\Delta\theta(s) = \angle[AC(s,Nr)AC^*(s_0,Nr)] \qquad (2)$$

Each of the parameter s and the parameter $s_0$ expresses the number of reception antennas. Each of s and $s_0$ expresses any one of 1, 2, 3 and 4. The asterisk (*) expresses a complex conjugate operator. ∠[x] expresses a phase component of a complex number x and is represented by the expression (3).

[Expression 3]

$$\angle[x] = \tan^{-1}(Im[x]/Re[x]) \qquad (3)$$

Incidentally, Im[x] expresses an imaginary part of the complex number and Re expresses a real part of the complex number.

The phase corrector 23 corrects the phase component of the sliding correlation value AC(s,k) in the reception antenna ANTs calculated by the correlation value calculator 20 in accordance with the expression (4) based on the phase shift quantity output from the phase shift quantity calculator 22.

[Expression 4]

$$\angle[AC(s,k)] - \Delta\theta(s) \quad (4)$$

The phase corrector 23 stores the sliding correlation value (see the expression (5)) having the corrected phase component in the reception antenna ANTs at discrete time of k=2Nr to (Nr+Nu) in the storage 24 based on the timing information output from the timing controller 21 for indicating that the corrected sliding correlation value is stored.

[Expression 5]

$$|AC(s,k)|\exp(j\{\angle[AC(s,k)] - \Delta\theta(s)\}) \quad (5)$$

The arrival angle and distance estimator 25 performs calculation to estimate the arrival angle of the target and the distance to the target based on the sliding correlation value AC(s,k) having the corrected phase component in each reception antenna ANTs stored in the storage 24. The calculation to estimate the arrival angle by the arrival angle and distance estimator 25 is a technique which has become publicly known. For example, this technique can be achieved by referring to Non-Patent Literature 2 which has been described above. Moreover, the calculation to estimate the distance to the target by the arrival angle and distance estimator 25 can be achieved by referring to Reference Non-Patent Literature 1 which will be described below.

(Reference Non-Patent Literature 1) J. J. BUSSGANG, et al., "A Unified Analysis of Range Performance of CW, Pulse, ad Pulse Doppler Radar", Proceedings of the IRE, Vol. 47, Issue 10, pp. 1753-1762 (1959)

For example, the arrival angle and distance estimator 25 calculates reception signal power in the reception antenna based on the correlation value having the corrected phase component in the reception antenna ANTs with respect to the arrival angle of the target. The reception signal power includes the phase component at the arrival angle of the target. The arrival angle and distance estimator 25 estimates the angle of the phase component in the case where the reception signal power takes a maximum value as the arrival angle of the target.

For example, the arrival angle and distance estimator 25 estimates the distance to the target based on the time difference between the discrete time in the case where the correlation value takes a maximum value and the transmission time of the high-frequency transmission signal based on the correlation value having the corrected phase component in the reception antenna ANTs with respect to the distance to the target.

As described above, in accordance with the radar device 1 according to the first embodiment, a phase shift quantity of a phase component in a correlation value between a reception signal received by each of reception antennas and a transmission signal can be calculated properly as measurement performance of the radar device while, for example, influence on the measurement time or measurement distance range is suppressed.

Moreover, the radar device 1 can correct the phase component of the correlation value in each reception antenna ANTs based on the properly calculated phase shift quantity to thereby suppress deterioration of accuracy of measurement of the arrival angle of the target and the distance to the target.

Moreover, in accordance with the radar device 1, it is unnecessary to provide any switching port for calibration in the switch 11, compare with the conventional radar device.

Accordingly, the radar device 1 can perform calibration concerned with the phase for the reception antenna ANTs in accordance with transmission of the high-frequency transmission signal, so that accurate measurement can be performed compared with the conventional radar device.

Moreover, in accordance with the radar device 1, because the transmission signal for calibration is the same as the transmission signal for measurement, execution can be made without addition of any correlation calculator for calibration to the signal processor 17, so that execution can be made without complication of circuit configuration.

[Modification 1 of First Embodiment]

In the first embodiment, each reception antenna ANTs is directly connected to the switch 11 so that the reception signal by the reception antenna ANTs is input to the switch 11. In Modification 1 of the first embodiment, the frequency of the reception signal is converted into a baseband by the frequency converter of the RF receiver so that the reception signal is input to the switch.

Figure 3:
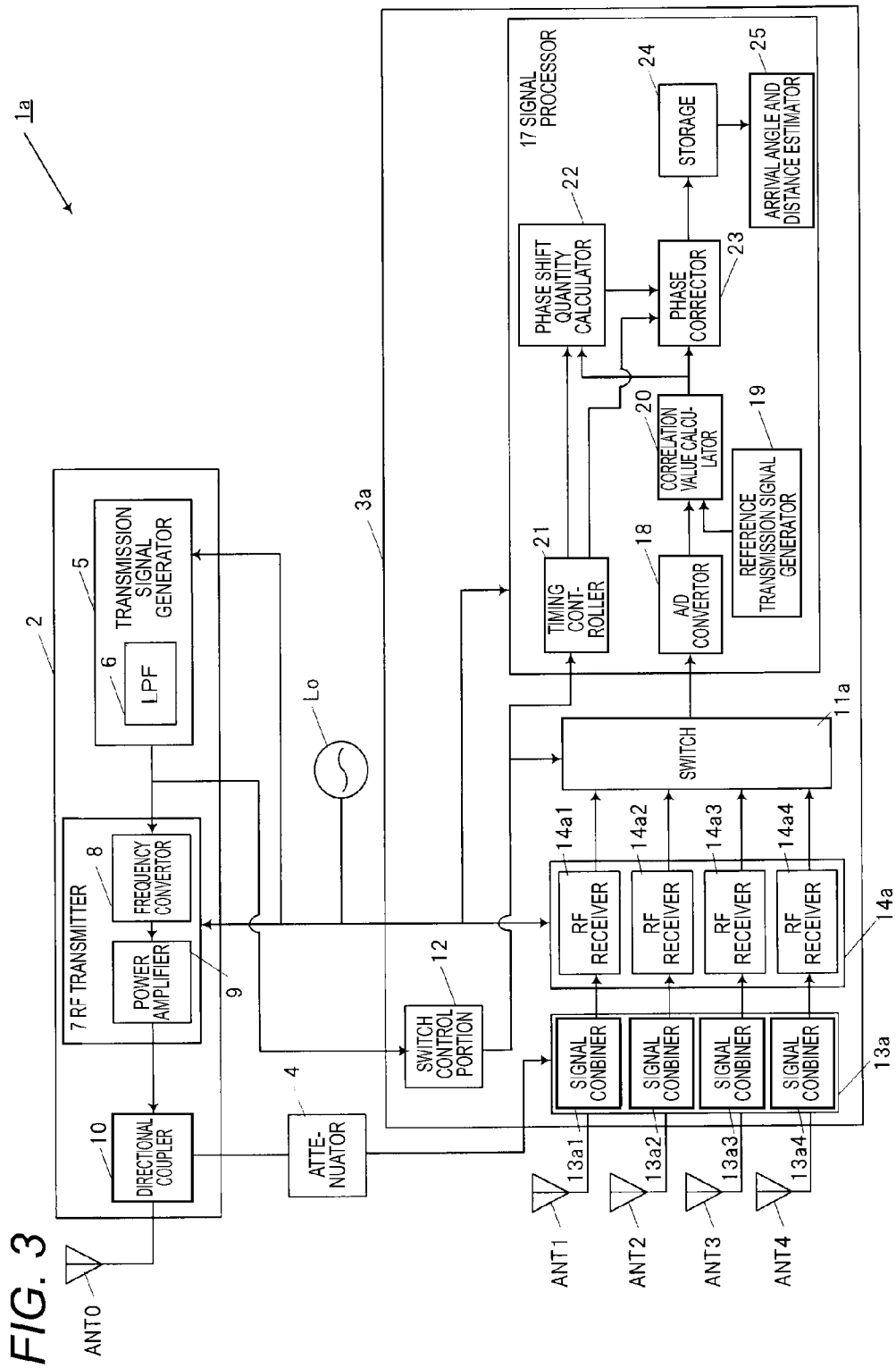
[FIG. 3] A block diagram illustrating the internal configuration of a radar device according to Modification 1 of the first embodiment.

FIG. 3 is a block diagram illustrating the internal configuration of a radar device 1*a* according to Modification 1 of the first embodiment. Although the difference in configuration and operation of Modification 1 of the first embodiment from the radar device 1 according to the first embodiment will be described with reference to FIG. 3, description of the same configuration and operation as those of the radar device 1 according to the first embodiment will be omitted.

In FIG. 3, a radar receiver 3*a* has four reception antennas ANT1 to ANT4, a signal combiner 13*a*, a RF receiver 14*a*, a switch 11*a*, a switch controller 12, and a signal processor 17.

The signal combiner 13*a* has a signal combiner 13*a*1 to which a reception signal by the reception antenna ANT1 is input, a signal combiner 13*a*2 to which a reception signal by the reception antenna ANT2 is input, a signal combiner 13*a*3 to which a reception signal by the reception antenna ANT3 is input, and a signal combiner 13*a*4 to which a reception signal by the reception antenna ANT4 is input. A high-frequency transmission signal attenuated by an attenuator 4 is input to the signal combiners 13*a*1 to 13*a*4.

Each of the signal combiners 13*a*1 to 13*a*4 combines a signal from a reception signal by corresponding one of the reception antennas ANT1 to ANT4 connected to the signal combiners 13*a*1 to 13*a*4 respectively and the high-frequency transmission signal attenuated by the attenuator 4, and outputs the combined signal to corresponding one of RF receivers 14*a*1 to 14*a*4 of the RF receiver 14*a*, similarly to the signal combiner 13 according to the first embodiment.

The RF receiver 14*a* has a RF receiver 14*a*1 to which the combined signal output from the signal combiner 13*a*1 is input, a RF receiver 14*a*2 to which the combined signal output from the signal combiner 13*a*2 is input, a RF receiver 14*a*3 to which the combined signal output from the signal combiner 13*a*3 is input, and a RF receiver 14*a*4 to which the combined signal output from the signal combiner 13*a*4 is input.

Each of the RF receivers 14*a*1 to 14*a*4 has the same configuration as that of the RF receiver 14 in the first embodiment. Like the RF receiver 14, each of the RF receivers 14*a*1 to 14*a*4 receives and amplifies the combined signal output from corresponding one of the signal combiners 13*a*1 to 13*a*4, and frequency-converts the amplified combined signal to generate a baseband reception signal composed of an in-phase signal and a quadrature signal. The reception signal generated by each of the RF receivers 14*a*1 to 14*a*4 is input to the switch 11*a*.

The switch 11a is provided with switching ports corresponding to the RF receivers 14a1 to 14a4 respectively so that the switch 11a is connected to each of the RF receivers 14a1 to 14a4.

The switch 11a sequentially changes the switching ports corresponding to the RF receivers 14a1 to 14a4 under control of the switch controller 12 so that a single switching port is selected and the switch 11a is connected to the RF receiver 14a corresponding to the switching port.

The switch 11a outputs a baseband reception signal generated by the selected RF receiver 14a to the signal processor 17 by changing the switching port. Processing after that is the same as in the first embodiment.

As described above, in the radar device 1a according to Modification 1 of the first embodiment, because the signal combiners 13a and the RF receivers 14a are provided in accordance with the reception antennas ANT1 to ANT4, the configuration of the radar receiver 3a is complicated compared with the radar device 1 according to the first embodiment.

However, in the switch 11a, the switching port is changed in accordance with the baseband reception signal generated by the RF receiver 14a. For this reason, power loss of the reception signal at the time of changing in the switch 11a can be reduced compared with the radar device 1 according to the first embodiment in which the switching port is changed in accordance with the high-frequency reception signal.

Hence, in accordance with the radar device 1a according to Modification 1 of the first embodiment, SNR (Signal Noise Ratio) at reception of a signal reflected by a target in a measurement period can be improved compared with the radar device 1 according to the first embodiment. As a result, in accordance with the radar device 1a, accuracy of measurement of the target in the measurement period can be improved.

[Modification 2 of First Embodiment]

In the first embodiment, each reception antenna ANTs is directly connected to the switch 11 so that a reception signal by each reception antenna ANTs is input to the switch 11. In Modification 2 of the first embodiment, the frequency of a reception signal is converted into an intermediate frequency band as an IF (Intermediate Frequency) band by the frequency converter of the RF receiver so that the reception signal is input to the switch.

Figure 4:
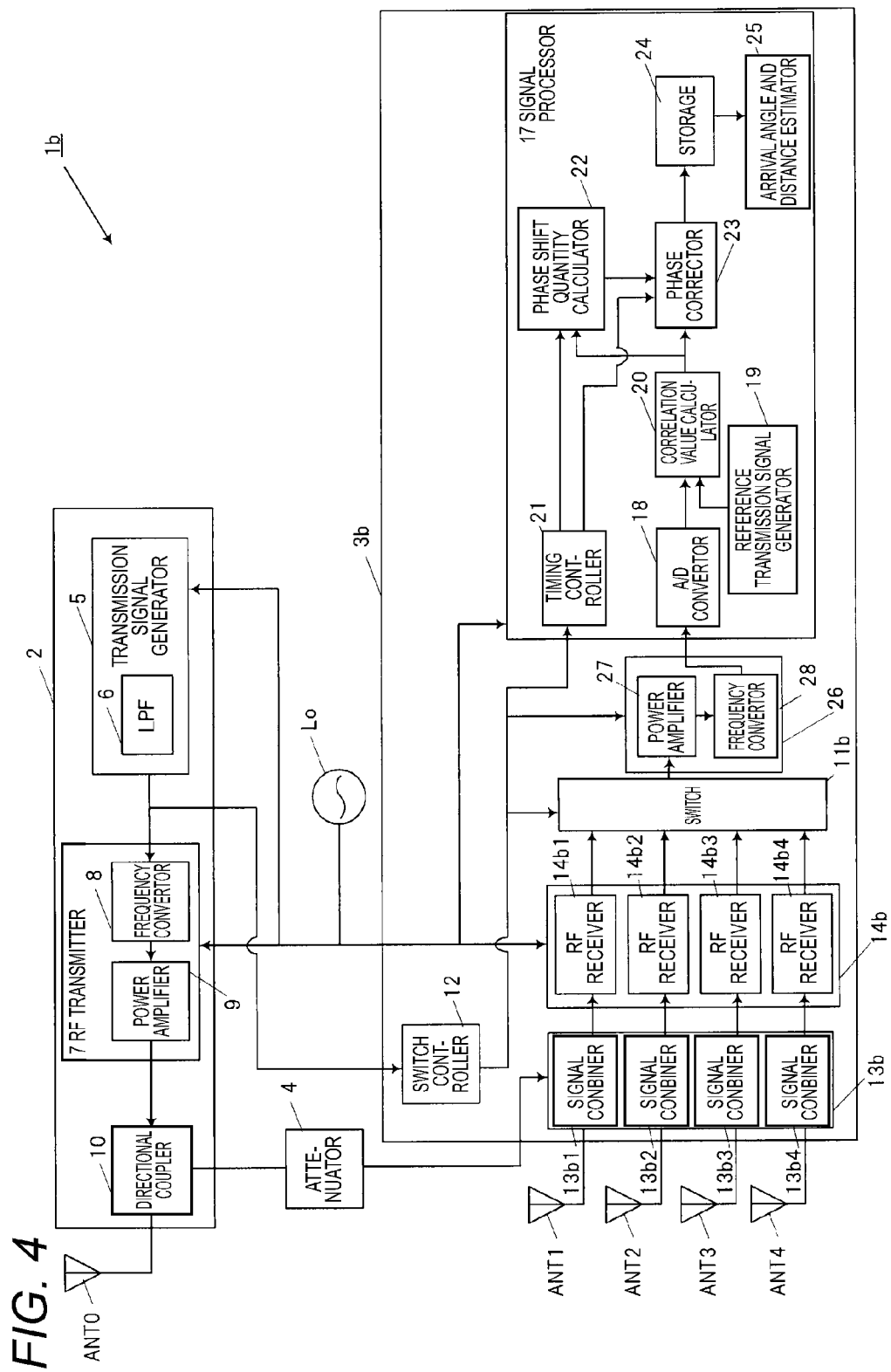
[FIG. 4] A block diagram illustrating the internal configuration of a radar device according to Modification 2 of the first embodiment.

FIG. 4 is a block diagram illustrating the internal configuration of a radar device 1b according to Modification 2 of the first embodiment. Although the difference in configuration and operation of Modification 2 of the first embodiment from the radar device 1 according to the first embodiment will be described with reference to FIG. 4, description of the same configuration and operation as those of the radar device 1 according to the first embodiment will be omitted.

In FIG. 4, a radar receiver 3b has four reception antennas ANT1 to ANT4, a signal combiner 13b, a RF receiver 14b, a switch 11b, a switch controller 12, an IF receiver 26, and a signal processor 17.

The signal combiner 13b has a signal combiner 13b1 to which a reception signal by the reception antenna ANT1 is input, a signal combiner 13b2 to which a reception signal by the reception antenna ANT2 is input, a signal combiner 13b3 to which a reception signal by the reception antenna ANT3 is input, and a signal combiner 13b4 to which a reception signal by the reception antenna ANT4 is input. A high-frequency transmission signal attenuated by an attenuator 4 is input to the signal combiners 13b1 to 13b4.

Like the signal combiner 13 in the first embodiment, each of the signal combiners 13b1 to 13b4 combines a signal from a reception signal by corresponding one of the reception antennas ANT1 to ANT4 connected to the signal combiners 13b1 to 13b4 respectively and the high-frequency transmission signal attenuated by the attenuator 4, and outputs the combined signal to corresponding one of RF receivers 14b1 to 14b4 of the RF receiver 14b.

The RF receiver 14b has a RF receiver 14b1 to which the combined signal output from the signal combiner 13b1 is input, a RF receiver 14b2 to which the combined signal output from the signal combiner 13b2 is input, a RF receiver 14b3 to which the combined signal output from the signal combiner 13b3 is input, and a RF receiver 14b4 to which the combined signal output from the signal combiner 13b4 is input.

Each of the RF receivers 14b1 to 14b4 has the same configuration as that of the RF receiver 14 in the first embodiment. Like the RF receiver 14, each of the RF receivers 14b1 to 14b4 receives and amplifies the combined signal output from corresponding one of the signal combiners 13b1 to 13b4, and frequency-converts the amplified combined signal to generate an intermediate frequency band reception signal. The reception signal generated by each of the RF receivers 14b1 to 14b4 is input to the switch 11b.

The switch 11b is provided with switching ports corresponding to the RF receivers 14b1 to 14b4 respectively so that the switch 11b is connected to each of the RF receivers 14b1 to 14b4. The switch 11b sequentially changes the switching ports corresponding to the four RF receivers 14b1 to 14b4 under control of the switch controller 12. By this changing, a single switching port is selected so that the switch 11b is connected to the RF receiver 14b corresponding to the switching port. The switch 11b outputs an intermediate frequency band reception signal generated by the selected RF receiver 14b to the IF receiver 26 by changing the switching port.

The IF receiver 26 has a power amplifier 27 and a frequency converter 28. The IF receiver 26 generates a timing clock based on a reference signal generated by an oscillator Lo so that the reference signal is multiplied by a predetermined number. The IF receiver 26 operates based on the generated timing clock. Specifically, the power amplifier 27 receives as an input the intermediate frequency band reception signal output from the switch 11b, amplifies the signal power of the input reception signal to predetermined signal power, and outputs the reception signal to the frequency converter 28.

The frequency converter 28 receives as an input the reception signal output from the power amplifier 27, frequency-converts the input reception signal and phase-shifts the phase component of part of the reception signal by 90 [degrees] based on quadrature detection to thereby generate a baseband reception signal composed of an in-phase signal and a quadrature signal. The frequency converter 28 outputs the generated reception signal to the signal processor 17. Processing after that is the same as in the first embodiment.

As described above, in the radar device 1b according to Modification 2 of the first embodiment, because the signal combiners 13b and the RF receivers 14b are provided in accordance with the reception antennas ANT1 to ANT4, the configuration of the radar receiver 3b is complicated compared with the radar device 1 according to the first embodiment. However, in the switch 11b, the switching port is changed in accordance with the intermediate frequency band reception signal generated by the RF receiver 14b. For this reason, power loss of the reception signal at the time of changing in the switch 11b can be reduced compared with the radar device 1 according to the first embodiment in which the switching port is changed in accordance with the high-frequency reception signal.

Hence, in accordance with the radar device 1*b* according to Modification 2 of the first embodiment, SNR at reception of a signal reflected by a target in a measurement period can be improved compared with the radar device 1 according to the first embodiment. As a result, in accordance with the radar device 1*b*, accuracy of measurement of the target in the measurement period can be improved.

[Modification 3 of First Embodiment]

The first embodiment has been described to the effect that a phase shift quantity in each reception antenna ANTs is calculated by the signal processor 17 in sync with the transmission cycle Tr [sec] of the high-frequency transmission signal whenever the high-frequency transmission signal is transmitted.

In Modification 3 of the first embodiment, when variation in phase shift quantity in each reception antenna ANTs is initially set to be slow, a cycle of from the transmission start timing of the high-frequency transmission signal in the measurement period of the first reception antenna to the transmission end timing of the high-frequency transmission signal in the measurement period of the last reception antenna is set as a changeover cycle to switch whether the high-frequency transmission signal attenuated by the attenuator 4 is input to the signal combiner or not.

Figure 5:
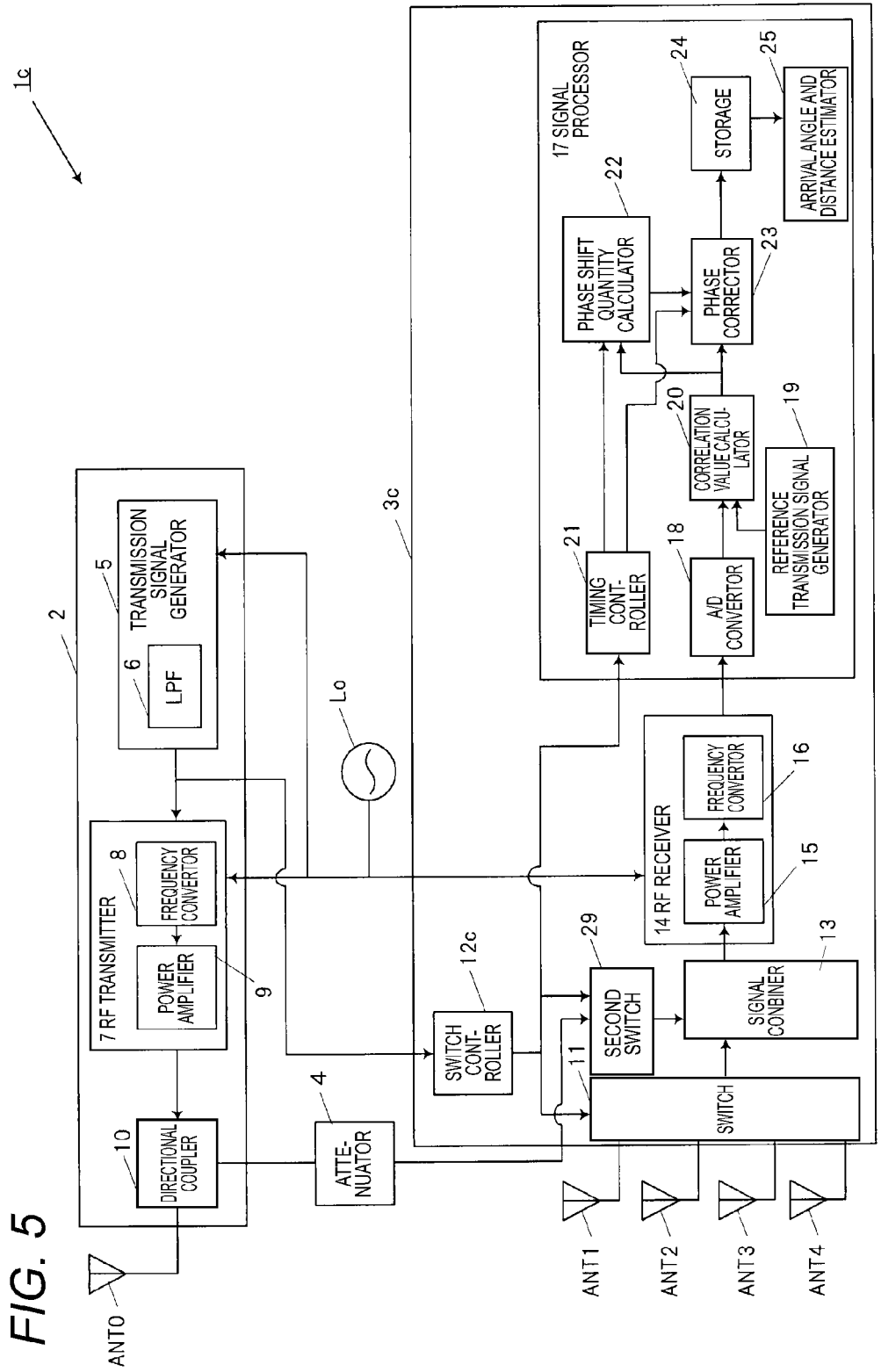
[FIG. 5] A block diagram illustrating the internal configuration of a radar device according to Modification 3 of the first embodiment.
Figure 6:
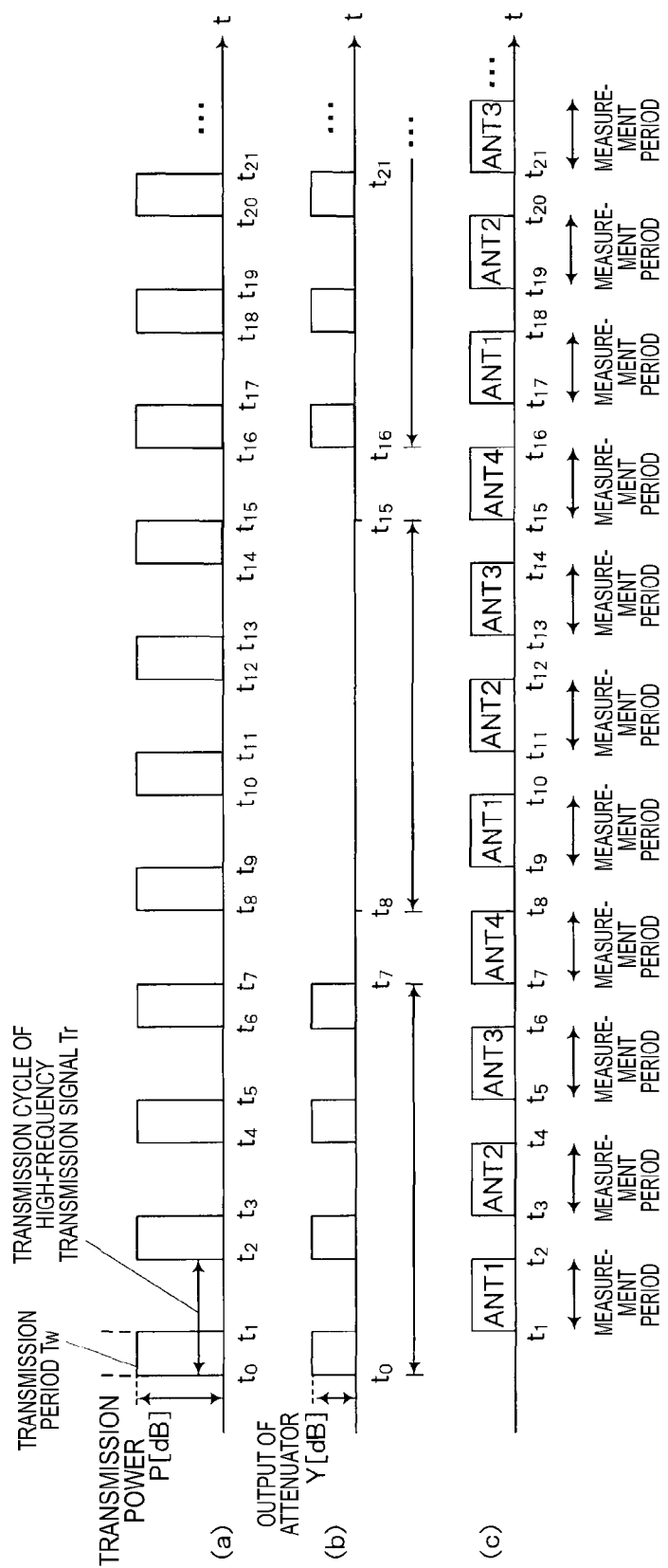
[FIG. 6] A timing chart concerned with operation of the radar device according to Modification 3 of the first embodiment, in which (a) is an explanatory view illustrating a timing chart of a high-frequency transmission signal, (b) is an explanatory view for explaining a timing chart of the high-frequency transmission signal input to a signal combiner, and (c) is an explanatory view illustrating a period of measurement by each reception antenna.
Figure 7:
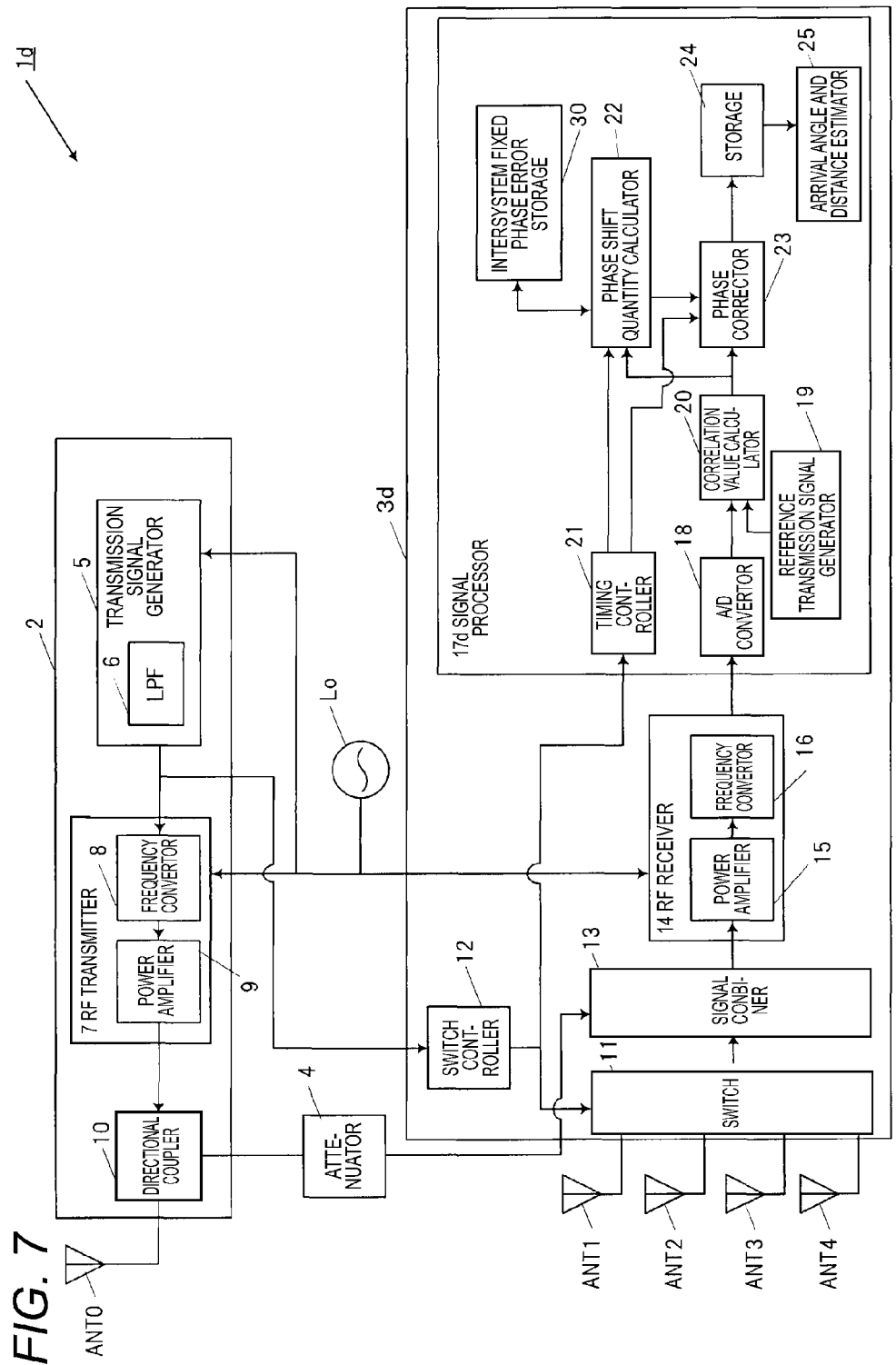
[FIG. 7] A block diagram illustrating the internal configuration of a radar device according to Modification 4 of the first embodiment.

FIG. 5 is a block diagram illustrating the internal configuration of a radar device 1*c* according to Modification 3 of the first embodiment. FIG. 6 is a timing chart concerned with operation of the radar device 1*c* according to Modification 3 of the first embodiment. In FIG. 6, (a) is an explanatory view illustrating a timing chart of a high-frequency transmission signal. In FIG. 6, (b) is an explanatory view illustrating a timing chart of the high-frequency transmission signal input to a signal combiner 13. In FIG. 6, (c) is an explanatory view illustrating a period of measurement by each of reception antennas.

Although the difference in configuration and operation of Modification 3 of the first embodiment from the radar device 1 according to the first embodiment will be described with reference to FIGS. 5 and 6, description of the same configuration and operation as those of the radar device 1 according to the first embodiment will be omitted.

In FIG. 5, a radar receiver 3*c* has four reception antennas ANT1 to ANT4, a switch 11, a second switch 29, a switch controller 12*c*, a signal combiner 13, a RF receiver 14, and a signal processor 17.

The second switch 29 receives as an input the high-frequency transmission signal attenuated by the attenuator 4. The second switch 29 uses a cycle of from the start timing of the measurement period of the first reception antenna ANT1 to the end timing of the measurement period of the last reception antenna ANT4 as a changeover cycle. The second switch 29 switches whether the input high-frequency transmission signal is input to the signal combiner 13 or not, in accordance with control of the switch controller 12*c* in each changeover cycle.

Specifically, as shown in (b) of FIG. 6, the switch controller 12*c* uses a cycle of from time $t_0$ which is the start timing of the measurement period of the first reception antenna ANT1 to time $t_7$ which is the end timing of the measurement period of the last reception antenna ANT4 as a changeover cycle. The switch controller 12*c* controls the second switch 29 so that the attenuated high-frequency transmission signal input in sync with the transmission period of the high-frequency transmission signal is input to the signal combiner 13 in accordance with each changeover cycle.

The switch controller 12*c* controls the second switch 29 so that the attenuated high-frequency transmission signal input in sync with the transmission period of the high-frequency transmission signal is not input to the signal combiner 13 during a period of time $t_8$-$t_{15}$ which is the next similar changeover cycle. Processing after that is the same as in the first embodiment.

Hence, in accordance with the radar device 1*c* according to Modification 3 of the first embodiment, accuracy of estimation of the arrival angle of the target and the distance to the target can be kept equal to that in the radar device 1 according to the first embodiment. Moreover, in accordance with the radar device 1*c*, there is a period in which inputting of the high-frequency transmission signal output from the attenuator 4 to the signal combiner 13 is blocked by the second switch 29. In the period, the radar device 1*c* need not perform calculation of the phase shift quantity in each reception antenna ANTs and calculation of phase correction, etc. Accordingly, the radar device 1*c* can reduce power consumption caused by operation of the phase shift quantity and phase correction, etc. compared with the radar device 1 according to the first embodiment.

[Modification 4 of First Embodiment]

In the first embodiment, it is possible to correct the phase shift quantity in the reception signal due to operation of each element after the signal combiner 13 of the radar receiver 3. When there is fixed phase error in each system from the reception antenna to the switch 11 which are respective elements before the signal combiner 13, it is however difficult to correct the phase shift quantity inclusive of the fixed phase error.

In Modification 4 of the first embodiment, fixed phase error E(s) in each system from the reception antenna to the switch 11 is measured in advance so that the measured phase error E(s) is held in the signal processor.

The signal processor 17*d* has an A/D converter 18, a reference transmission signal generator 19, a correlation value calculator 20, a timing controller 21, a phase shift quantity calculator 22, an intersystem fixed phase error storage 30, a phase corrector 23, a storage 24, and an arrival angle and distance estimator 25.

The intersystem fixed phase error storage 30 stores phase error E(s) measured in advance as fixed phase error E(s) in each system from the reception antenna ANTs to the switch 11 before the radar device 1*d* starts measurement for detecting the target. For example, the phase error E(s) is measured in accordance with each reception antenna ANTs and stored in a table format in accordance with the reception antenna ANTs.

For calculation of the phase shift quantity in each reception antenna ANTs, the phase shift quantity calculator 22 calculates the phase shift quantity $\Delta\theta(s)$ in accordance with the expression (6) including intersystem fixed phase error E(s) corresponding to the reception antenna ANTs stored in the intersystem fixed phase error storage 30 instead of the expression (2). Processing after that calculation is the same as in the first embodiment.

[Expression 6]

$$\Delta\theta(s)=\angle[AC(s,Nr)AC^*(s_0,Nr)]-E(s) \qquad (6)$$

Hence, in accordance with the radar device 1*d* according to Modification 4 of the first embodiment, the phase shift quantity in each reception antenna ANTs inclusive of the intersystem fixed phase error in each system from the reception antenna ANTs to the switch 11 can be corrected more accurately. Hence, in accordance with the radar device 1*d*, deterioration of accuracy of measurement of the arrival angle of the target and the distance to the target can be suppressed.

[Second Embodiment]

In a second embodiment, a transmission antenna ANT0 and reception antennas ANT1 to ANT4 are disposed so as to be located so that a high-frequency transmission signal transmitted from the transmission antenna ANT0 can be directly received by each of the reception antennas ANT1 to ANT4 by using side lobes of the directional pattern of the transmission antenna ANT0, side lobes of the reception antennas ANT1 to ANT4 or the like. Moreover, in the second embodiment, the two measurement periods of a reference phase update period and an ordinary period are repeated at regular intervals so that calculation of the phase shift quantity in each reception antenna ANTs and correction of the phase component of the correlation value based on the calculated phase shift quantity are performed.

In the reference phase update period, the second switch 31 is turned on to perform inputting of the high-frequency transmission signal attenuated by the attenuator 4 to the signal combiner 13 in the same manner as in the first embodiment. Moreover, after inputting to the signal combiner 13, the phase component of the correlation value in each reception antenna ANTs is corrected. Then, the second switch 31 is turned off to block inputting of the attenuated high-frequency transmission signal to the signal combiner 13. In this state, a crosstalk signal directly received from the transmission antenna ANT0 by the reception antenna ANTs is used so that the fixed phase error in each system of from the reception antenna ANTs to the switch 11 is calculated as a reference phase $\Delta\phi(s)$.

In the ordinary period, the second switch 31 is turned off to block inputting of the high-frequency transmission signal attenuated by the attenuator 4 to the signal combiner 13 after the reference phase $\Delta\phi(s)$ is calculated in the reference phase update period. In this state, the phase component of the correlation value in each reception antenna ANTs is corrected inclusive of the reference phase $\Delta\phi(s)$ calculated in the reference phase update period.

(Operation in Reference Phase Update Period in Radar Device 1e According to Second Embodiment)

The configuration of the radar device 1e according to the second embodiment and the operation in the reference phase update period will be described below.

Figure 8:
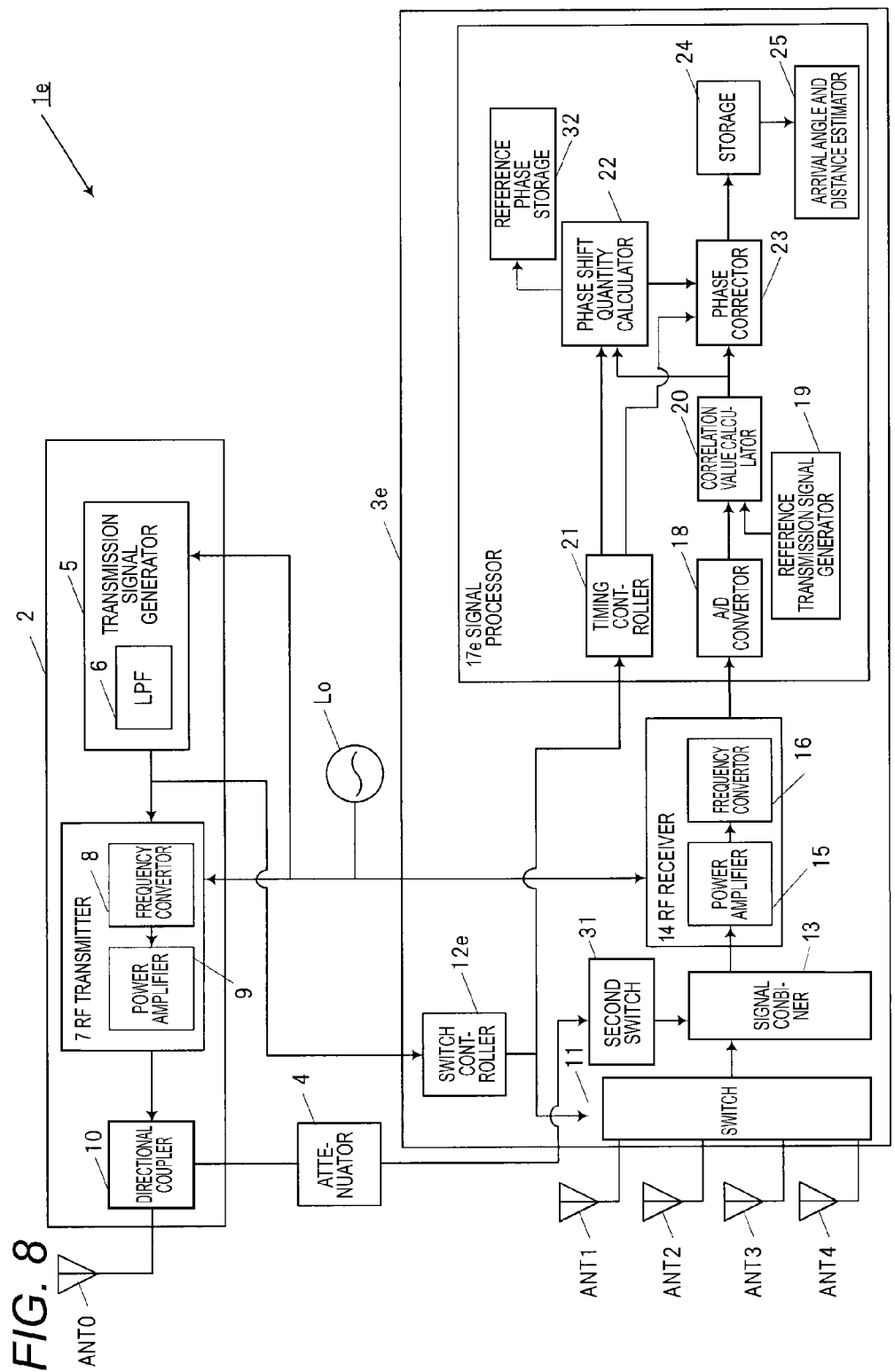
[FIG. 8] A block diagram illustrating the internal configuration of a radar device according to a second embodiment.
Figure 9:
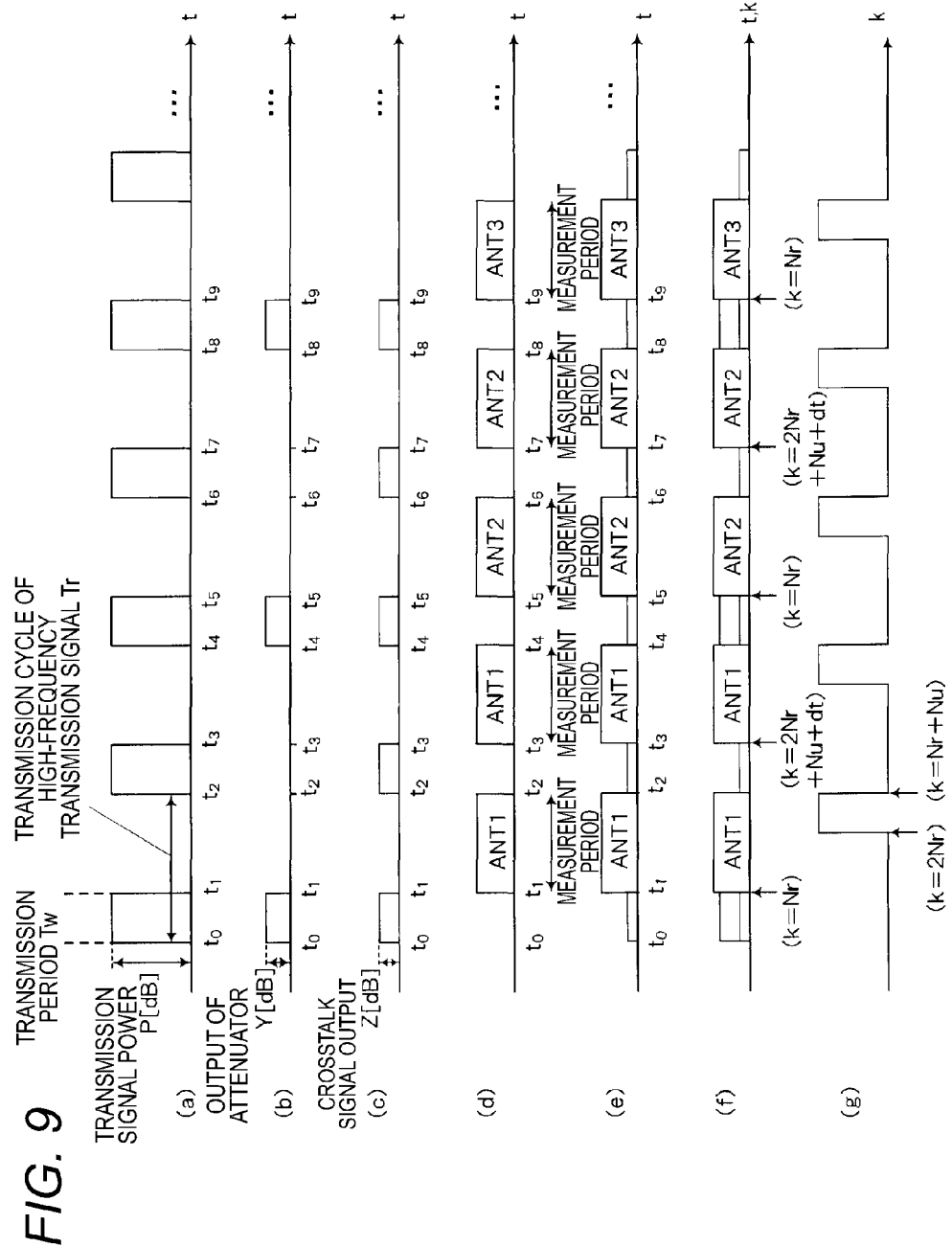
[FIG. 9] A timing chart concerned with operation of the radar device according to the second embodiment, in which (a) is an explanatory view illustrating a timing chart of a high-frequency transmission signal, (b) is an explanatory view illustrating a timing chart of the high-frequency transmission signal input to a signal combiner, (c) is an explanatory view illustrating a timing chart of a crosstalk signal caused by direct going of the high-frequency transmission signal to each reception antenna, (d) is an explanatory view illustrating a period of measurement by each reception antenna, (e) is an explanatory view illustrating an output of a reception signal from a switch and a period of measurement by each antenna, (f) is an explanatory view illustrating an output from the signal combiner, a period of measurement by each reception antenna and a timing for calculating a phase shift quantity, and (g) is an explanatory view illustrating a period for storing a correlation value between a transmission signal and a reception signal.
Figure 10:
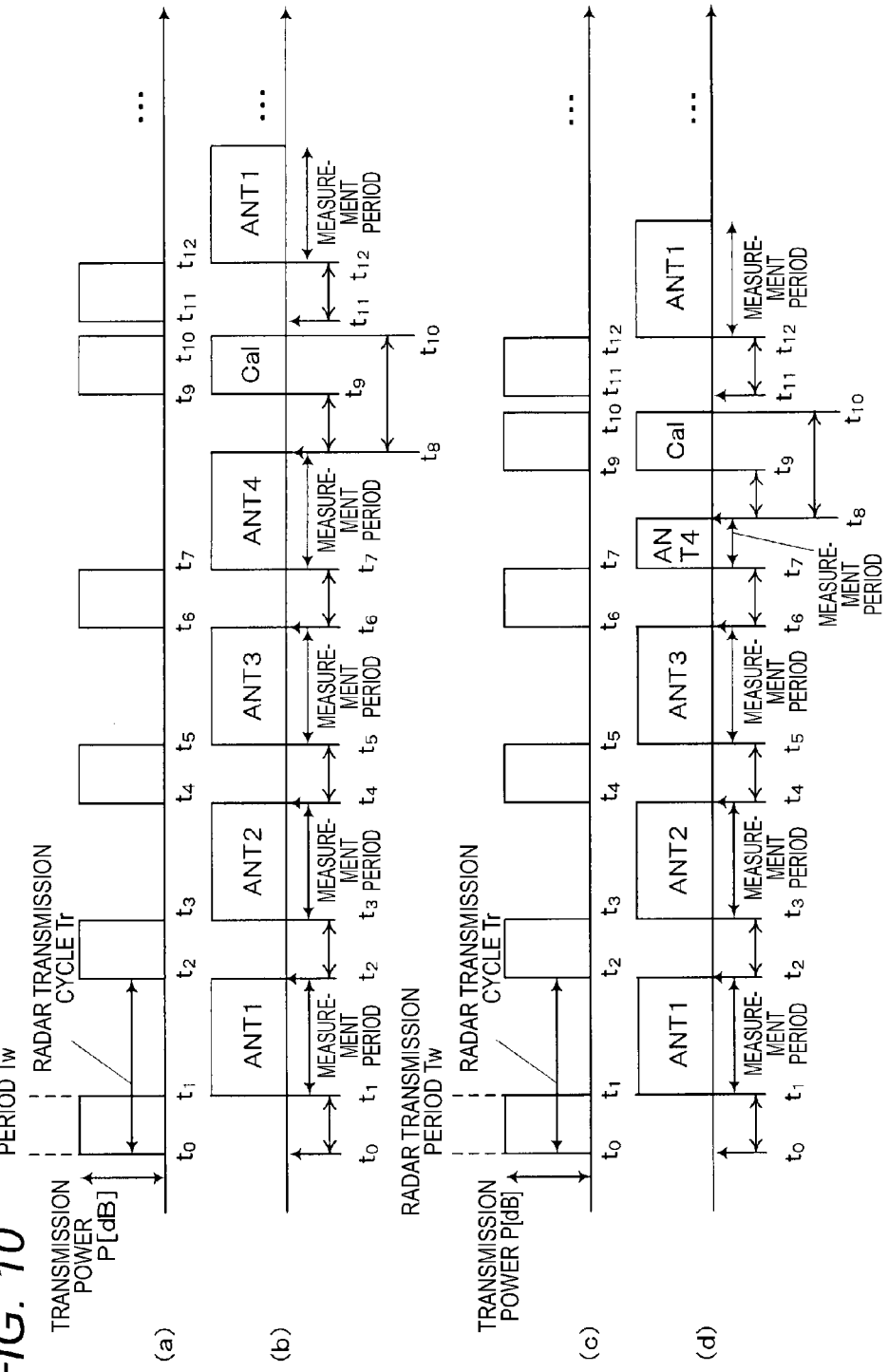
[FIG. 10] A timing chart in the case where calibration is performed after reception by each antenna in a conventional radar device, in which (a) is an explanatory view illustrating a timing chart of a high-frequency transmission signal, (b) is an explanatory view illustrating a state where a phase shift quantity measurement period for calibration is provided after measurement by each antenna, (c) is an explanatory view illustrating a timing chart of a high-frequency transmission signal, and (d) is an explanatory view illustrating a state where a phase shift quantity measurement period for calibration is provided after measurement by each antenna.

The configuration and operation of the radar device 1e according to the second embodiment will be described with reference to FIGS. 8 and 9. FIG. 8 is a block diagram illustrating the internal configuration of the radar device 1e according to the second embodiment. FIG. 9 is a timing chart concerned with operation in the reference phase update period of the radar device 1e.

In FIG. 9, (a) is an explanatory view illustrating a timing chart of a high-frequency transmission signal. In FIG. 9, (b) is an explanatory view illustrating a timing chart of the high-frequency transmission signal input to the signal combiner 13. In FIG. 9, (c) is an explanatory view illustrating a timing chart of a crosstalk signal in the case where the high-frequency transmission signal directly goes to the reception antenna ANTs. In FIG. 9, (d) is an explanatory view illustrating a period of measurement by each reception antenna ANTs.

In FIG. 9, (e) is an explanatory view illustrating an output of the reception signal from the switch 11 and a period of measurement by each reception antenna ANTs. In FIG. 9, (f) is an explanatory view illustrating an output from the signal combiner 13, a period of measurement by each reception antenna and a timing for calculating a phase shift quantity. In FIG. 9, (g) is an explanatory view illustrating a period for storing a correlation value between a transmission signal and a reception signal.

As shown in FIG. 8, the radar device 1e has an oscillator Lo, a radar transmitter 2, a radar receiver 3e, a transmission antenna ANT0, reception antennas ANT1 to ANT4, and an attenuator 4. Because the configuration and operation (see (a) of FIG. 9) of the radar transmitter 2 are the same as those in the first embodiment, description of the configuration and operation of the radar transmitter 2 will be omitted. Moreover, because the operation (see (b) of FIG. 9) of the attenuator 4 is the same as in the first embodiment, description of the operation of the attenuator 4 will be omitted.

The radar receiver 3e has four reception antennas ANT1 to ANT4, a switch 11, a second switch 31, a switch controller 12e, a signal combiner 13, a RF receiver 14, and a signal processor 17e.

The RF receiver 14 has a power amplifier 15, and a frequency converter 16. The signal processor 17e has an ND converter 18, a reference transmission signal generator 19, a correlation value calculator 20, a timing controller 21, a reference phase storage 32, a phase shift quantity calculator 22, a phase corrector 23, a storage 24, and an arrival angle and distance estimator 25.

The reception antennas ANT1 to ANT4 form an array antenna of four reception antennas ANT1 to ANT4. The reception antennas ANT1 to ANT4 receive both a signal obtained due to reflection of a high-frequency transmission signal transmitted from the radar transmitter 2 by a target and a feeble high-frequency transmission signal transmitted from the transmission antenna ANT0 and directly going to each of the reception antennas ANT1 to ANT4 (see (c) of FIG. 9).

The feeble high-frequency transmission signal directly going to the reception antennas ANT1 to ANT4 is based on side lobes of the directional pattern of the transmission antenna ANT0, side lobes of the reception antennas ANT1 to ANT4, or the like.

Although description will be made on the assumption that the number of elements of the array antenna in the radar device 1e according to the second embodiment is 4 as shown in FIG. 8, the number of elements of the array antenna is not limited to 4.

The switch 11 is provided with switching ports corresponding to the four reception antennas ANT1 to ANT4 so that the switch 11 is connected to the reception antennas. In the switch 11, the respective switching ports corresponding to the four reception antennas ANT1 to ANT4 for receiving signals reflected by a target are changed sequentially under control of the switch controller 12e so that a single switching port is selected so that the switch 11 is connected to a reception antenna corresponding to the switching port. The switch 11 outputs a reception signal received by the selected reception antenna to the signal combiner 13.

The second switch 31 switches whether the high-frequency transmission signal attenuated by the attenuator 4 is input to the signal combiner 13 or not, in accordance with control of the switch controller 12e.

The switch controller 12e controls the switch 11 so that the four reception antennas ANT1 to ANT4 are changed sequentially in a cycle of an integer multiple N (N: integer) of the transmission cycle Tr [sec] of the high-frequency transmission signal transmitted from the transmission antenna ANT0.

In the reference phase update period in the second embodiment, the switch controller 12e controls the switch 11 so that the four reception antennas ANT1 to ANT4 are changed sequentially in a cycle N (integer satisfying N≥2) not smaller than twice as much as the transmission cycle Tr [sec] of the high-frequency transmission signal. In FIG. 9, (d) shows an example in which the switch 11 is controlled so that the four reception antennas ANT1 to ANT4 are changed sequentially in a cycle (N=2) twice as much as the transmission cycle Tr [sec] of the high-frequency transmission signal.

The switch controller 12e controls the second switch 31 so that the high-frequency transmission signal attenuated by the attenuator 4 is input to the signal combiner 13 in the transmission period of the high-frequency transmission signal in a first half of the cycle (2Tr) twice as much as the transmission cycle Tr [sec] of the high-frequency transmission signal.

The switch controller 12e controls the second switch 31 so that the high-frequency transmission signal attenuated by the attenuator 4 is not input to the signal combiner 13 in the transmission period of the high-frequency transmission signal in a second half of the cycle (2Tr) twice as much as the transmission cycle Tr [sec] of the high-frequency transmission signal.

Specifically, as shown in (b) and (d) of FIG. 9, the switch controller 12e changes the reception antenna for receiving a signal reflected by a target to the reception antenna ANT1 in a period of time $t_0$-$t_1$. Moreover, the switch controller 12e controls the switch 11 so that the reception signal received by the reception antenna ANT1 is output to the signal combiner 13 in a period of time $t_1$-$t_2$.

Moreover, the switch controller 12e controls the second switch 31 so that the high-frequency transmission signal attenuated by the attenuator 4 is input to the signal combiner 13 in a period of time $t_0$-$t_1$ which is the transmission period of the high-frequency transmission signal in a first half of the cycle twice as much as the transmission cycle Tr [sec] of the high-frequency transmission signal.

Accordingly, the period of time $t_1$-$t_2$ is used as a period of measurement by the reception antenna ANT1 in the same manner as in the first embodiment. Moreover, the switch controller 12e controls the second switch 31 so that the high-frequency transmission signal attenuated by the attenuator 4 is not input to the signal combiner 13 in a period of time $t_2$-$t_3$ which is the transmission period of the high-frequency transmission signal in a second half of the cycle twice as much as the transmission cycle Tr [sec] of the high-frequency transmission signal.

In the period of time $t_0$-$t_1$ and the period of time $t_2$-$t_3$, a crosstalk signal of the high-frequency transmission signal transmitted from the transmission antenna ANT0 because of side lobes of the directional pattern of the transmission antenna ANT0, side lobes of the reception antennas ANT1 to ANT4, or the like, is received by the reception antenna ANT1 in sync with the transmission period of the high-frequency transmission signal. The signal power of the crosstalk signal is considerably lower than the signal power of the attenuated high-frequency transmission signal.

Accordingly, with respect to the reception antenna ANT1, a correlation value having a phase shift quantity corrected based on the correlation value between the reference transmission signal and the reception signal in the reception antenna ANT1 is calculated in a period of time $t_0$-$t_2$ in the same manner as in the first embodiment. Moreover, with respect to the reception antenna ANT1, intersystem fixed phase error caused by direct reception of the crosstalk signal in the reception antenna ANT1 is calculated as a reference phase $\Delta\phi(1)$ in a period of time $t_2$-$t_4$.

The switch controller 12e controls the switch 11 so that the reception antenna is changed to the reception antenna ANT2 in a period of time $t_4$-$t_5$ and the reception signal received by the reception antenna ANT2 is output to the signal combiner 13 in a period of time $t_5$-$t_6$.

Moreover, the switch controller 12e controls the second switch 31 so that the high-frequency transmission signal attenuated by the attenuator 4 is input to the signal combiner 13 in a period of time $t_4$-$t_5$ which is the transmission period of the high-frequency transmission signal in a first half of the cycle twice as much as the transmission cycle Tr [sec] of the high-frequency transmission signal. Accordingly, the period of time $t_5$-$t_6$ is used as a period of measurement by the reception antenna ANT2 in the same manner as in the first embodiment.

Moreover, the switch controller 12e controls the second switch 31 so that the high-frequency transmission signal attenuated by the attenuator 4 is not input to the signal combiner 13 in a period of time $t_6$-$t_7$ which is the transmission period of the high-frequency transmission signal in a second half of the cycle twice as much as the transmission cycle Tr [sec] of the high-frequency transmission signal.

In a period of time $t_4$-$t_5$ and a period of time $t_6$-$t_7$, a crosstalk signal due to direct reception of the high-frequency signal transmitted from the transmission antenna ANT0 because of side lobes of the directional pattern of the transmission antenna ANT0, side lobes of the reception antennas ANT1 to ANT4, or the like, is received by the reception antenna ANT2 in sync with the transmission period of the high-frequency transmission signal. The signal power of the crosstalk signal is considerably lower than the signal power of the attenuated high-frequency transmission signal.

Accordingly, with respect to the reception antenna ANT2, a correlation value having a phase shift quantity corrected based on the correlation value between the reference transmission signal and the reception signal in the reception antenna ANT2 is calculated in a period of time $t_4$-$t_8$ in the same manner as in the first embodiment. Moreover, with respect to the reception antenna ANT2, intersystem fixed phase error caused by reception of the crosstalk signal in the reception antenna ANT2 is calculated as a reference phase $\Delta\phi(2)$ in a period of time $t_6$-$t_8$. The same thing applies to the other reception antennas ANT3 and ANT4.

Incidentally, the reception signal output from the switch 11 shows a signal combined from a noise signal around the radar device 1 and the crosstalk signal in periods of times $t_0$-$t_1$, $t_2$-$t_3$, $t_4$-$t_5$, $t_6$-$t_7$ and $t_8$-$t_9$ as shown in (e) of FIG. 9. Incidentally, because the signal power of the noise signal is very feeble compared with the signal power of the crosstalk signal, the reception signal output from the switch 11 can approximate the crosstalk signal.

The reception signal output from the switch 11 shows a signal combined from the crosstalk signal and a reception signal (not shown) corresponding to each measurement period (each of periods of times $t_1$-$t_2$, $t_3$-$t_4$, $t_5$-$t_6$ and $t_7$-$t_8$) in periods of times $t_1$-$t_2$, $t_3$-$t_4$, $t_5$-$t_6$ and $t_7$-$t_8$.

The signal combiner 13 combines a signal from a signal in which inputting of the high-frequency transmission signal output from the attenuator 4 is turned on or off by the second switch 31, and the reception signal output from the switch 11, and outputs the combined signal to the power amplifier 15 of the RF receiver 14.

When the second switch 31 is on, the signal combiner 13 combines a signal from the output of the attenuator 4 and the output of the switch 11. In this case, the output of the switch 11 includes a crosstalk signal which goes through side lobes of the transmission or reception antenna. When the average power of the crosstalk signal is Z [dB], the signal power output from the signal combiner is (Y+Z) [dB].

The average power Z [dB] of the crosstalk signal which goes through side lobes of the transmission or reception antenna is set to be signal power allowed to be received by the RF receiver 14 when an antenna pattern including the side lobe level of the transmission/reception antenna is designed. Incidentally, the signal power Y of the attenuator output of the radar transmission signal is attenuated to a sufficiently higher level (3 dB to 10 dB) than the reception signal level Z in this interval and then mixed by the signal combiner of the radar receiver.

However, when autocorrelation characteristic of the radar transmission signal has side lobes, the signal power Y of the attenuator output of the radar transmission signal is set to be low so that the side lobe level is a level undisturbed by the radar measurement period. The timing of mixing the attenuator output of the radar transmission signal is synchronized with the radar transmission signal while the time lag is suppressed.

Because operation of the RF receiver 14 is the same as in the first embodiment, description of the operation of the RF receiver 14 will be omitted.

Because operation of the A/D converter 18 is the same as in the first embodiment, description of the operation of the ND converter 18 will be omitted.

Because operation of the reference transmission signal generator 19 is the same as in the first embodiment, description of the operation of the reference transmission signal generator 19 will be omitted.

The correlation value calculator 20 calculates a correlation value AC(s,k) between the complex signal x(s,k) of the reception signal received by the reception antenna ANTs and the reference transmission signal r(n) output from the reference transmission signal generator 19. Assume now that a sliding correlation value as shown in the expression (1) is calculated as the correlation value.

Incidentally, when the transmission signal generated by the transmission signal generator 5 is a baseband signal r(n) composed of real numbers, this signal r(n) is used as the reference transmission signal for calculation of the sliding correlation value AC(s,k). On the other hand, when the transmission signal generated by the transmission signal generator 5 is a baseband signal r(n) composed of an in-phase signal and a quadrature signal, a complex conjugate value of this signal r(n) is used.

The timing controller 21 notifies the phase shift quantity calculator 22 of the timing information of termination of calculation of the sliding correlation value based on the timing $k_0$ of termination of the period Tw [sec] of presence of the high-frequency transmission signal transmitted from the transmission antenna ANT0 and input to the signal combiner 13 through the attenuator 4 while the timing $k_0$ is regarded as the timing of termination of calculation of the sliding correlation value AC(s,$k_0$) by the correlation value calculator 20.

As shown in (f) of FIG. 9, the timing $k_0$ of termination of the period Tw [sec] of presence of the high-frequency transmission signal transmitted from the transmission antenna ANT0 and input to the signal combiner 13 through the attenuator 4 is times $t_1$, $t_5$ and $t_9$ and corresponds to discrete time k=Nr.

The timing controller 21 notifies the phase corrector 23 of the timing information indicating that the sliding correlation value AC(s,k) corrected by the phase corrector 23 is stored in the storage 24, with respect to the sliding correlation value AC(s,k) between the complex signal x(s,k) of the reception signal received by the reception antenna ANTs and the reference transmission signal r(n) output from the reference transmission signal generator 19. Incidentally, discrete time k is from 2Nr to (Nr+Nu) and from (Nr+Nu)+2Nr to 2(Nr+Nu) (see (f) of FIG. 9).

The phase shift quantity calculator 22 extracts the sliding correlation value AC(s,Nr) in the reception antenna ANTs and the sliding correlation value AC($s_0$,Nr) in a reference reception antenna ANTs$_0$ (which will be described later) based on the timing information (e.g. time $t_1$, $t_5$, $t_9$) which is given from the timing controller 21 and which indicates that the period Tw [sec] of presence of the high-frequency transmission signal transmitted from the transmission antenna ANT0 and input to the signal combiner 13 through the attenuator 4 is terminated.

Here, the reception antenna ANTs$_0$ which is one of the four reception antennas ANT1 to ANT4 shown in FIG. 8 and which is used as a reference for calculating the phase shift quantity is referred to as reference reception antenna. Moreover, the sliding correlation value AC($s_0$,Nr) in the reference reception antenna ANTs$_0$ and the sliding correlation value AC(s,Nr) in the reception antenna ANTs have been already calculated by the correlation value calculator 20.

The phase shift quantity calculator 22 calculates the phase shift quantity Δθ(s) in the reception antenna ANTs in accordance with the expression (2) based on the sliding correlation value AC(s,Nr) in the reception antenna ANTs and the sliding correlation value AC($s_0$,Nr) in the reference reception antenna ANTs$_0$. The phase shift quantity calculator 22 outputs the calculated phase shift quantity Δθ(s) to the phase corrector 23.

Moreover, the phase shift quantity calculator 22 extracts the correlation value AC(s,Nr+Nu+Nr+dt) in the crosstalk signal calculated by the correlation value calculator 20 based on the timing information (e.g. time $t_3$, $t_7$) which is given from the timing controller 21 and which indicates that calculation of the sliding correlation value is terminated. The phase shift quantity calculator 22 corrects the phase shift quantity Δθ(s) in accordance with the expression (7) based on the extracted correlation value AC(s,Nr+Nu+Nr+dt). Moreover, the phase shift quantity calculator 22 calculates intersystem fixed phase error in each system including the reception antenna ANTs (reception antenna ANT1 at time $t_3$) and the switch 11 as a reference phase Δϕ(s) in the reception antenna ANTs.

Assume now that the sliding correlation value AC(s,Nr+Nu+Nr+dt) in the reception antenna ANTs has been already calculated by the correlation value calculator 20.

[Expression 7]

$$\Delta\Phi(s) = \angle[AC(s,Nr+Nu+Nr+dt)] - \Delta\theta(s) \quad (7)$$

Here, as described above, discrete time k=Nr+Nu+Mr+dt shows timing when the crosstalk signal is received by the reception antenna ANTs. Here, dt [sec] shows a delay of arrival time of the signal directly received from side lobes of the transmission antenna ANT0 through side lobes of the reception antenna. dt depends on arrangement of the transmission antenna ANT0 and the reception antennas ANT1 to ANT4 (distance between the transmission antenna and each reception antenna). It is however preferable that dt is not smaller than one pulse width in the pulse train.

In this case, when the sliding correlation value AC(s,Nr) in the reception antenna ANTs is calculated based on the timing information indicating that the period Tw [sec] of presence of the high-frequency transmission signal transmitted from the transmission antenna ANT0 and input to the signal combiner 13 through the attenuator 4 is terminated, a correlation value can be obtained so that the influence of the crosstalk signal superposedly received is reduced. Accordingly, the reference phase can be calculated more accurately.

The phase corrector 23 corrects the sliding correlation value AC(s,k) calculated by the correlation value calculator 20 in accordance with the expression (4) based on the phase shift quantity output from the phase shift quantity calculator 22. The phase corrector 23 stores the phase component of the corrected sliding correlation value AC(s,k) in the storage 24.

The phase corrector 23 stores the sliding correlation value (see the expression (5)) having the corrected phase component in the reception antenna ANTs at discrete time k=2Nr to (Nr+Nu) and (Nr+Nu+Nr) to 2(Nr+Nu) in the storage 24 based on the timing information output from the timing controller 21 for indicating that the corrected sliding correlation value is stored.

Because operation of the arrival angle and distance estimator 25 is the same as in the first embodiment, description of operation of the arrival angle and distance estimator 25 will be omitted.

(Operation in Ordinary Period in Radar Device 1e According to Second Embodiment)

Although the difference of operation in the ordinary period of the radar device 1e according to the second embodiment from the operation in the reference phase update period will be described below, description of the same in contents as the operation in the reference phase update period will be omitted.

The switch controller 12e controls the switch 11 so that the four reception antennas ANT1 to ANT4 are sequentially changed in a cycle of an integer multiple N (N: integer) of the transmission cycle Tr [sec] of the high-frequency transmission signal transmitted from the transmission antenna ANT0. In the ordinary period in the second embodiment, the switch controller 12e controls the switch 11 so that the four reception antennas ANT1 to ANT4 are sequentially changed in a cycle (N=2) twice as much as the transmission cycle Tr [sec] of the high-frequency transmission signal, similarly to (d) of FIG. 9.

In the ordinary period, the switch controller 12e controls the second switch 31 so that inputting of the high-frequency transmission signal attenuated by the attenuator 4 to the signal combiner 13 is blocked.

The correlation value calculator 20 calculates the sliding correlation value AC(s,Nr+dt) between the crosstalk signal in the reception antenna ANTs and the reference transmission signal in the same manner as the correlation value calculator 20 in the first embodiment.

The phase shift quantity calculator 22 extracts the correlation value AC(s,Nr+dt) between the crosstalk signal in the reception antenna ANTs and the reference transmission signal based on the timing of termination of calculation of the sliding correlation value output from the timing controller 21, and corrects the phase shift quantity of the reception antenna ANTs in accordance with the expression (8) based on the reference phase $\Delta\phi(s)$ stored in the reference phase storage 32.

[Expression 8]

$$\Delta\theta(s) = \angle[AC(s,Nr+dt)] - \Delta\Phi(s) \quad (8)$$

The phase corrector 23 corrects the sliding correlation value AC(s,k) calculated by the correlation value calculator 20 in accordance with the expression (4) based on the phase shift quantity output from the phase shift quantity calculator 22. The phase corrector 23 stores the phase component of the corrected sliding correlation value AC(s,k) in the storage 24.

The phase corrector 23 stores the sliding correlation value (see the expression (5)) having the corrected phase component in the reception antenna ANTs at discrete time k=2Nr to (Nr+Nu) in the storage 24 based on the timing information output from the timing controller 21 for indicating that the corrected sliding correlation value is stored.

As described above, in accordance with the radar device 1e according to the second embodiment, like the radar device 1 according to the first embodiment, the phase shift quantity in the reception antenna can be calculated properly based on the correlation value between the reception signal reflected by the target and received by the reception antenna ANTs and the reference transmission signal.

Moreover, in accordance with the radar device 1e, intersystem fixed phase error in the reception antenna ANTs can be calculated properly based on the correlation value between the crosstalk signal directly going from the transmission antenna ANT0 to the reception antenna ANTs and the reference transmission signal.

Hence, in accordance with the radar device 1e, intersystem fixed phase error in each system of the reception antenna ANTs and the switch 11 and the phase shift quantity based on the correlation value between the reference transmission signal and the reception signal can be calculated properly while the influence on measurement performance of the radar device is suppressed.

Moreover, in accordance with the radar device 1e, the phase error can be corrected in real time even when the intersystem phase error in each system of the reception antenna ANTs and the switch 11 varies with time in a portion preceding the signal combiner 13.

The radar device 1e can suppress deterioration of accuracy of measurement of the arrival angle of the target ad the distance to the target by properly correcting the phase component of the correlation value in each reception antenna ANTs based on the properly calculated phase error and phase shift.

Moreover, in accordance with the radar device 1e, like the radar device 1 according to the first embodiment, it is unnecessary to provide any switching port for calibration in the switch 11 compared with the conventional radar device. Accordingly, the radar device 1e can perform calibration for the reception antenna ANTs in accordance with transmission of the high-frequency transmission signal, so that accurate measurement can be performed compared with the conventional radar device.

[Third Embodiment]

Figure 11:
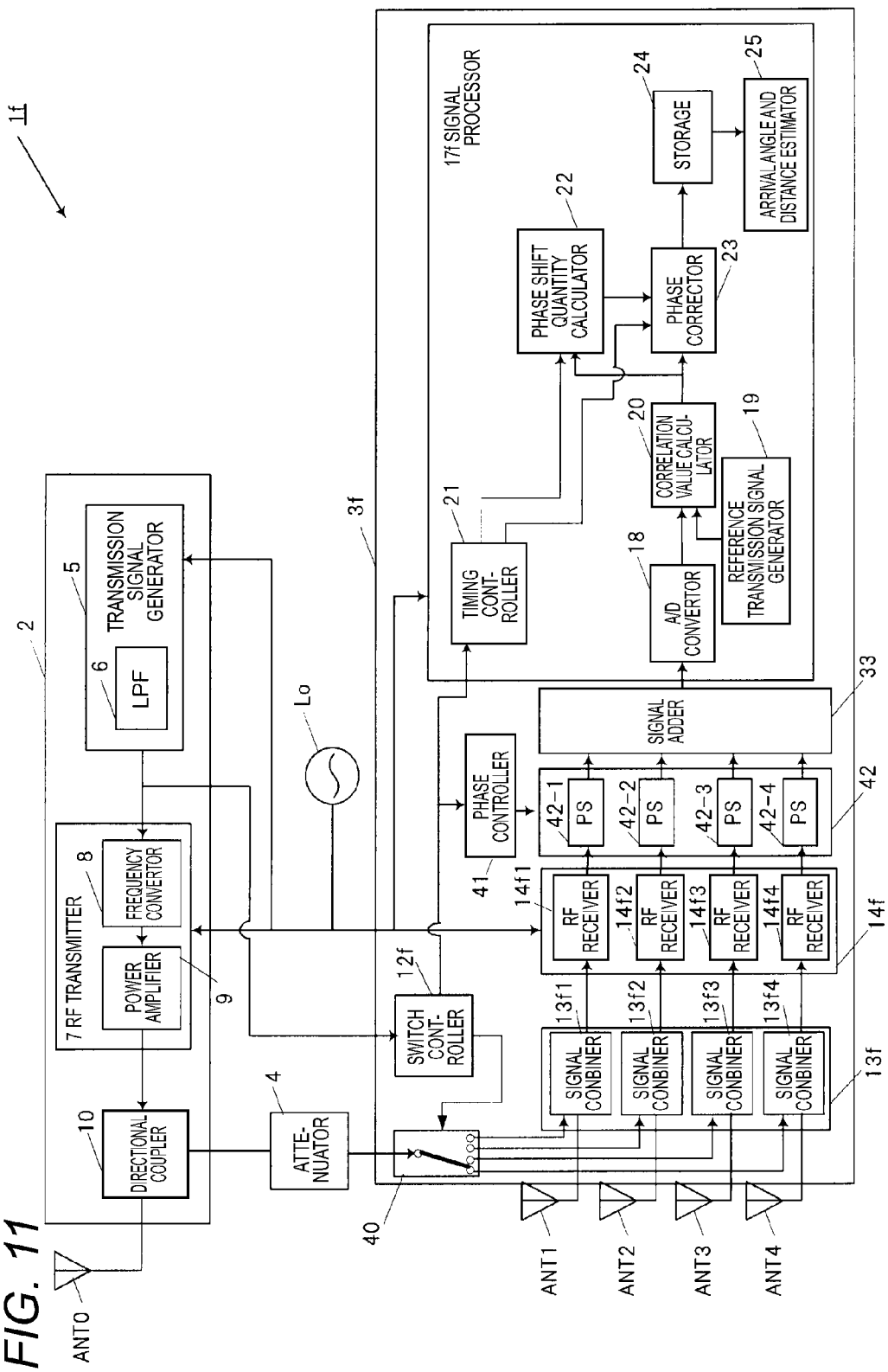
[FIG. 11] A block diagram illustrating the internal configuration of a radar device according to a third embodiment.

The configuration and operation of a radar device 1f according to a third embodiment will be described with reference to FIGS. 11 and 12. FIG. 11 is a block diagram illustrating the internal configuration of the radar device 1f according to the third embodiment.

Figure 12:
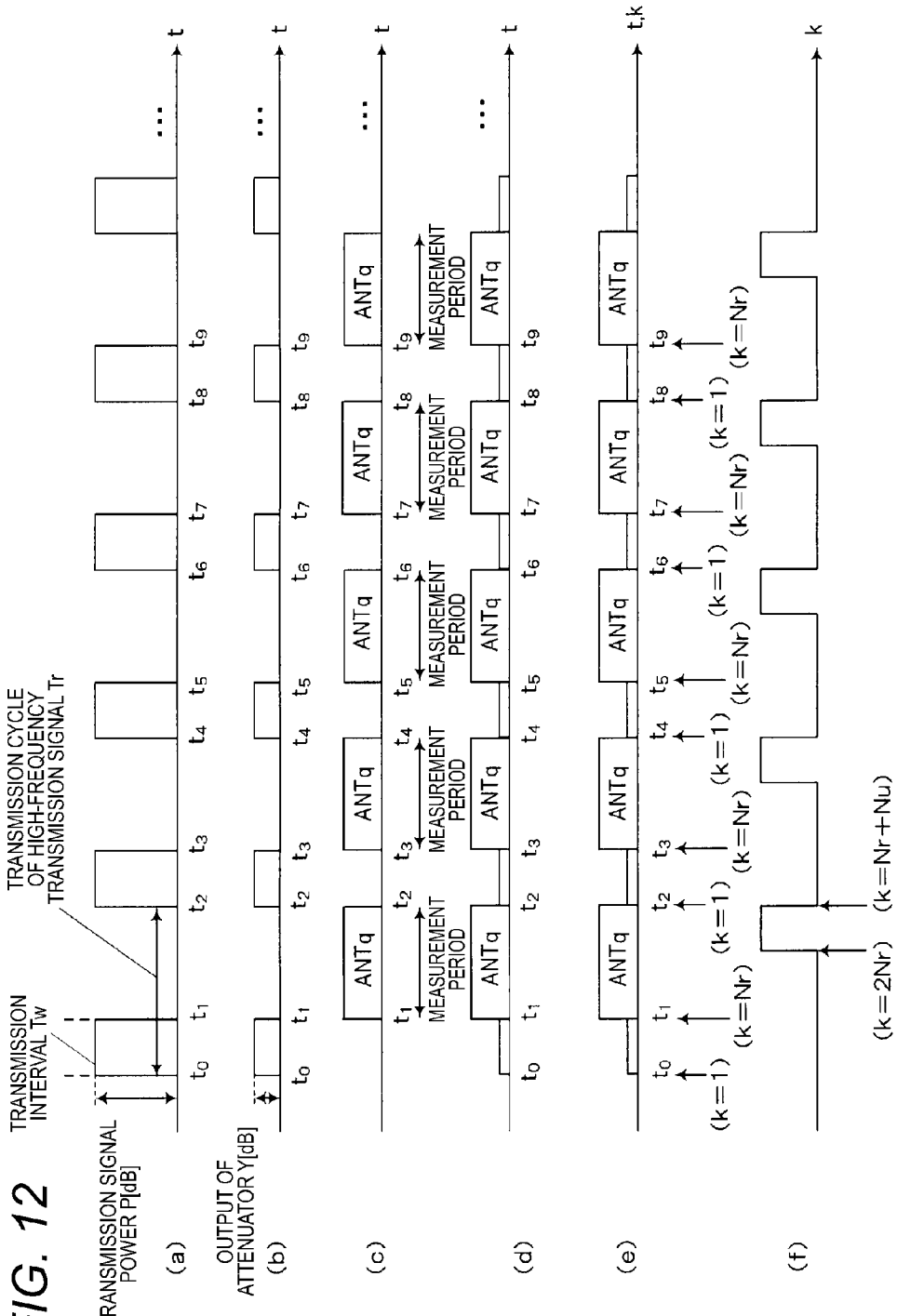
[FIG. 12] A timing chart concerned with operation of the radar device according to the third embodiment, in which (a) is an explanatory view illustrating a timing chart of a high-frequency transmission signal, (b) is an explanatory view illustrating a timing chart of the high-frequency transmission signal input to a signal combiner from an attenuator, (c) is an explanatory view illustrating a period of measurement by each reception antenna, (d) is an explanatory view illustrating a reception signal output from the signal combiner and a period of measurement by each reception antenna, (e) is an explanatory view illustrating an output from the signal combiner, a period of measurement by each reception antenna and a timing for calculating a phase shift quantity, and (f) is an explanatory view illustrating a period for storing a correlation value between a transmission signal and a reception signal.

FIG. 12 is a timing chart concerned with operation of the radar device 1f according to the third embodiment. In FIG. 12, (a) is an explanatory view illustrating a timing chart of a high-frequency transmission signal. In FIG. 12, (b) is an explanatory view illustrating a timing chart of the high-frequency transmission signal input to a signal combiner 13f from an attenuator 4. In FIG. 12, (c) is an explanatory view illustrating a period of measurement by each of reception antennas ANT1 to ANT4. In FIG. 9, (d) is an explanatory view illustrating a reception signal output from the signal combiner 13f and a period of measurement by each of the reception antennas ANT1 to ANT4.

In FIG. 12, (e) is an explanatory view illustrating an output of the signal combiner 13f, a period of measurement by each of the reception antennas ANT1 to ANT4 and a timing of calculating a phase shift quantity. In FIG. 12, (f) is an explanatory view illustrating a period for storing a correlation value between a transmission signal and a reception signal.

As shown in FIG. 11, the radar device 1f has an oscillator Lo, a radar transmitter 2, a radar receiver 3f, a transmission antenna ANT0, reception antennas ANT1 to ANT4, and an attenuator 4. Because the configuration of the radar device 1f is the same as in the first embodiment except the radar receiver 3f, description thereof will be omitted. With respect to the configuration of the radar receiver 3f in the radar device 1f, mainly different points in configuration and operation will be described below.

As shown in (a) of FIG. 12, assume that Nr [pieces] of discrete time samples are provided as a baseband transmission signal r(n) in a period Tw [sec] of presence of a high-frequency transmission signal transmitted from the transmission antenna ANT0 from the radar transmitter 2 whereas Nu [pieces] of discrete time samples are provided as a baseband transmission signal r(n) in a period (Tr-Tw) [sec] of absence of the high-frequency transmission signal.

The parameter Tr is a transmission cycle [sec] of the high-frequency transmission signal transmitted from the transmission antenna ANT0. As shown in (a) of FIG. 12, the high-frequency transmission signal is transmitted cyclically by the transmission cycle Tr in periods of times $t_0$-$t_1$, $t_2$-$t_3$, $t_4$-$t_5$, $t_6$-$t_7$ and $t_8$-$t_9$ but not transmitted in periods of times $t_1$-$t_2$, $t_3$-$t_4$, $t_5$-$t_6$ and $t_7$-$t_8$. After time $t_9$, transmission of the high-frequency transmission signal is repeated in the same manner.

As shown in (b) of FIG. 12, the attenuator 4 attenuates the signal power of the high-frequency transmission signal output from the directional coupler 10 to predetermined signal power Y [dB] in sync with the transmission period of the high-frequency transmission signal.

The radar receiver 3f has four reception antennas ANT1 to ANT4, a transmission signal changer 40, a switch controller 12f, signal combiners 13f1 to 13f4, RF receivers 14f1 to 14f4, a phase controller 41, phase shifters 42-1 to 42-4, a signal adder 33, and a signal processor 17. The RF receiver 14f has a power amplifier 15 and a frequency converter 16. The signal processor 17 has an A/D converter 18, a reference transmission signal generator 19, a correlation value calculator 20, a timing controller 21, a phase shift quantity calculator 22, a phase corrector 23, a storage 24, and an arrival angle and distance estimator 25.

The reception antennas ANT1 to ANT4 form an array antenna of four reception antennas ANT1 to ANT4. The reception antennas ANT1 to ANT4 receive both a signal obtained due to reflection of the high-frequency transmission signal transmitted from the radar transmitter 2 by a target and a noise signal around the radar device 1 as a reception signal. Although description will be made in the case where the number of elements of the array antenna in the radar device 1f according to the third embodiment is 4 as shown in FIG. 11, the number of elements of the array antenna is not limited to 4.

In the transmission signal changer 40, respective switching ports corresponding to the four signal combiners 13f1 to 13f4 are changed sequentially under control of the switch controller 12f. By this changing, a single switching port is selected so that a signal combiner 13fq corresponding to the switching port is connected to the transmission signal changer 40. Here, the parameter q is a natural number up to the number of reception antennas. In the case of FIG. 11, q is 1 to 4. The transmission signal changer 40 outputs the high-frequency transmission signal from the attenuator 4 to the selected signal combiner 13fq.

The switch controller 12f sequentially changes the respective switching ports of the transmission signal changer 40 corresponding to the four signal combiners 13f1 to 13f4 in a cycle of an integer multiple N (N: integer) of the transmission cycle Tr [sec] of the high-frequency transmission signal. Although the third embodiment shows an example in which the switch controller 12f controls the transmission signal changer 40 to sequentially change the respective switching ports of the transmission signal changer 40 corresponding to the four signal combiners 13f1 to 13f4 in the same cycle (N=1) as the transmission cycle Tr [sec] of the high-frequency transmission signal, the third embodiment is not limited thereto.

Specifically, the switch controller 12f performs switching so that the output of the transmission signal changer 40 which is the high-frequency transmission signal from the attenuator 4 is input to the selected signal combiner 13f1 in a period of time $t_0$-$t_1$. Here, changeover transition time ΔTsw in the transmission signal changer 40 may be considered so that the changeover operation is performed prior to time $t_0$-ΔTsw.

The switch controller 12f performs switching so that the output of the transmission signal changer 40 which is the high-frequency transmission signal from the attenuator 4 is input to the selected signal combiner 13f2 in a period of time $t_2$-$t_3$.

The switch controller 12f performs switching so that the output of the transmission signal changer 40 which is the high-frequency transmission signal from the attenuator 4 is input to the selected signal combiner 13f3 in a period of time $t_4$-$t_5$.

The switch controller 12f performs switching so that the output of the transmission signal changer 40 which is the high-frequency transmission signal from the attenuator 4 is input to the selected signal combiner 13f4 in a period of time $t_6$-$t_7$.

After that, the switch controller 12f performs switching in the same manner so that the signal is input to the signal combiner 13fq in a cycle of an integer multiple N (N: integer) of the transmission cycle Tr [sec] of the high-frequency transmission signal. When the high-frequency transmission signal output from the attenuator 4 is not included as a result of interposition of the transmission signal changer 40, the signal combiner 13fq has only the reception signal output from the reception ANTq as shown in (c) of FIG. 12.

On the other hand, when the high-frequency transmission signal output from the attenuator 4 is included as a result of interposition of the transmission signal changer 40, the signal combiner 13fq combiners a signal from the reception signal output from the reception ANTq and the high-frequency transmission signal output from the attenuator 4 and outputs the combined signal to the RF receiver 14fq, as shown in (d) of FIG. 12. Here, when the average signal power of the reception signal output from the reception ANTq is Z [dB], the signal power of the combined signal output from the signal combiner 13fq is (Y+Z) [dB].

Incidentally, when the signal power Y [dB] of the high-frequency transmission signal output from the attenuator 4 is included in the signal combiner 13fq as a result of interposition of the transmission signal changer 40, it is preferable that the signal power is attenuated to sufficiently higher signal power (e.g. 3 [dB] to 10 [dB]) than the signal power received by the reception antenna ANTs in the transmission period (of e.g. time $t_0$-$t_1$ etc.) of the high-frequency transmission signal. For this reason, when power of the high-frequency transmission signal output from the attenuator 4 is insufficient, a level adjuster for adjusting the level to a predetermined level is disposed in place of the attenuator 4 so that amplification through an amplification circuit included in the level adjuster makes up for shortage of power. The level adjuster may be formed from the attenuator 4.

When there are side lobes in autocorrelation characteristic of the high-frequency transmission signal, it is preferable that the attenuator 4 attenuates the signal power of the high-frequency transmission signal output from the directional coupler 10 to such signal power that the side lobe level has no influence on the measurement period of the radar device 1.

Each of the RF receivers 14/1 to 14/4 generates a timing clock based on a reference signal generated by the oscillator Lo so that the reference signal is multiplied by a predetermined number. Each of the RF receiver 141f to 14/4 operates based on the generated timing clock. Each of the RF receivers 14/1 to 14/4 receives as an input the combined signal combined by corresponding one of the signal combiners 13/1 to 13/4, amplifies the signal power of the input combined signal to predetermined signal power and frequency-converts the signal to a baseband signal.

Moreover, each of the RF receivers 14/1 to 14/4 shifts the phase component of part of the combined signal by 90 [degrees] based on quadrature detection to thereby generate a baseband reception signal composed of an in-phase signal and a quadrature signal, and outputs the generated reception signal to the phase shifter (PS: Phase Shifter) 32. The baseband reception signal composed of an in-phase signal I(t) and a quadrature signal Q(t) which is the output of the RF receiver 14fq at time t is described here as a complex signal xq(t)=Iq(t)+Qq(t).

The phase shifters 42-1 to 42-4 receive output signals of the RF receivers 14/1 to 14/4 as inputs respectively, and give phase rotations φ1 to φ4 designated by the phase controller 41 to the input output signals of the RF receivers 14/1 to 14/4 respectively.

The signal adder 33 applies an adding process to the respective outputs of the phase shifters 42-1 to 42-4. Here, an output signal OS(t) of the signal adder 33 at time t can be represented by the expression (9). Incidentally, j is an imaginary unit.

[Expression 9]

$$OS(t) = \sum_{q=1}^{4} x_q(t) \exp(j\phi_q) \quad (9)$$

By operation of the phase shifters 42-1 to 42-4 and the signal adder 33, the radar receiver 3f can form directivity of the reception antenna array in a predetermined direction. For example, when reception antennas are disposed on a line at regular intervals of Dant, a reception beam (directivity of the reception antenna array) can be formed in a direction θ as represented by φq=(q−1)Dant·sin θ·2π/λ.

The phase controller 41 can change the phase rotations φ1 to φ4 cyclically based on a control signal in a cycle of an integer multiple N2 (N2: integer) of the transmission cycle Tr [sec] of the high-frequency transmission signal in the switch controller 12f. Accordingly, the reception beam can be changed in accordance with the cycle of an integer multiple N2 (N2: integer) of the transmission cycle Tr [sec].

The A/D converter 18 performs sampling at discrete time k for the output of the signal adder 33 to thereby convert the reception signal into digital data. The reception signal at discrete time k which is the output of the signal adder 33 in the case where the high-frequency transmission signal output from the attenuator 4 is included in the signal combiner 13fq through the transmission signal changer 40 is described here as a complex signal of a complex number x(q,k)=I(q,k)+jQ(q,k) using an in-phase signal component I(q,k) and a quadrature signal component Q(q,k) in the output of the signal adder 33. Incidentally, j is an imaginary unit.

Moreover, the parameter k shows discrete time corresponding to the number of samples of the baseband transmission signal r(n) included in the high-frequency transmission signal. In the third embodiment, the timing of transmitting the transmission signal is set at k=1 and k=1 to (Nr+Nu). Accordingly, as shown in (e) of FIG. 12, the parameter k satisfies k=1 in the timing of time $t_0$, time $t_2$, time $t_4$, time $t_6$ and time $t_s$. Moreover, the parameter k satisfies k=Nr in the timing of time $t_1$, time $t_3$, time $t_5$, time $t_7$ and time $t_9$.

The reference transmission signal generator 19 generates a timing clock based on a reference signal generated by the oscillator Lo in the same manner as the transmission signal generator 5 in sync with operation of the transmission signal generator 5 so that the reference signal is multiplied by a predetermined number. The reference transmission signal generator 19 cyclically generates a reference transmission signal r(n) of the same baseband as the transmission signal generated by the transmission signal generator 5 based on the generated reference signal. The reference transmission signal generator 19 outputs the generated reference transmission signal r(n) to the correlation value calculator 20.

The correlation value calculator 20 calculates a correlation value AC(q,k) between the complex signal x(q,k) which is the reception signal output at discrete time k from the signal adder 33, and the reference transmission signal r(n) output from the reference transmission signal generator 19. Assume now that a sliding correlation value as shown in the expression (1) is calculated as the correlation value.

The sliding correlation value AC(q,k) is a correlation value at discrete time k between the reception signal output at discrete time k from the signal adder 33, that is, the reception signal (including a reflected signal and a noise signal) received by a reception beam having a predetermined direction, and the reference transmission signal. The asterisk (*) in the expression (1) shows a complex conjugate operator. The sliding correlation value AC(q,k) is calculated in periods of k=1 to (Nr+Nu). That is, the sliding correlation value AC(q,k) is calculated in periods of times $t_0$-$t_2$, $t_2$-$t_4$, $t_4$-$t_6$, $t_6$-$t_8$, etc.

Incidentally, when the transmission signal generated by the transmission signal generator 5 is a baseband signal r(n) composed of real numbers, the signal r(n) is used as the reference transmission signal in calculation of the sliding correlation value AC(q,k). On the other hand, when the transmission signal generated by the transmission signal generator 5 is a baseband signal r(n) composed of an in-phase signal and a quadrature signal, a complex conjugate value of the signal r(n) is used.

The timing controller 21 regards the timing $k_0$ of completion of the period Tw [sec] (transmission period) of presence of the high-frequency transmission signal transmitted from the transmission antenna ANT0 as the timing of completion of calculation of the sliding correlation value AC(q,$k_0$) by the correlation value calculator 20, and notifies the phase shift quantity calculator 22 of the timing information of completion of calculation of the sliding correlation value AC(q,$k_0$).

The timing controller 21 notifies the phase shift quantity calculator 22 and the phase corrector 23 of the timing of sequentially changing the respective switching ports of the transmission signal changer 40 corresponding to the four signal combiners 13/1 to 13/4 and the information of the selected signal combiner 13f in a cycle of an integer multiple N (N: integer) of the transmission cycle Tr [sec] of the high-frequency transmission signal. The timing controller 21 notifies the phase shift quantity calculator 22 of the timing of permitting cyclical change the phase rotations φ1 to φ4 and the quantities of the phase rotations in the phase controller 32 based on a control signal in a cycle of an integer multiple N2 (N2: integer) of the transmission cycle Tr [sec] of the high-frequency transmission signal.

As shown in (c) and (e) of FIG. 12, the timing $k_0$ of completion of the period Tw [sec] of presence of the high-frequency transmission signal transmitted from the transmission antenna ANT0 and the timing of completion of calculation of the sliding correlation value AC(q,k$_0$) by the correlation value calculator 20 are the same points of time t$_1$, t$_3$, t$_5$, t$_7$ and t$_9$ and correspond to discrete time k$_0$=Nr.

The timing controller 21 notifies the phase corrector 23 of the timing information for indicating that the sliding correlation value AC(q,k) corrected by the phase corrector 23 is stored in the storage 24 with respect to the sliding correlation value AC(q,k) between the complex signal x(q,k) of the reception signal output at discrete time k from the signal adder 33, that is, the reception signal received by a reception beam having a predetermined direction, and the reference transmission signal r(n) output from the reference transmission signal generator 19. However, discrete time k satisfies k=2Nr to (Nr+Nu) (see (f) of FIG. 12).

Incidentally, the discrete time k can be also set in a range of k=(Nr+1) to (Nr+Nu). However, the start timing of discrete time k at which the sliding correlation value AC(q,k) is stored in the storage 24 is determined in the timing controller 21 not at k=Nr but at k=2Nr on the assumption that not a target nearest to the radar device 1f but a target at a predetermined distance [m] or farther from the radar device 1f is detected.

Accordingly, because it is not necessary to consider that the intensive reception level is received from a target nearest to the radar device 1 without distortion, the dynamic range in the radar receiver 3 of the radar device 1 can be reduced. With respect to the start timing of discrete time k at which the sliding correlation value AC(q,k) is stored in the storage 24, in the timing controller 21, the same thing applies to the flowing embodiments.

Or, the discrete time k can be set in a range of k=(Nr+1) to (Nu). Accordingly, the time range of superposing the high-frequency transmission signal on the sliding correlation value AC(q,k) can be eliminated so that deterioration of radar measurement performance can be prevented when the transmission signal directly goes to the radar receiver.

The phase shift quantity calculator 22 extracts a sliding correlation value AC(q,Nr) included in the high-frequency transmission signal output from the attenuator 4 to the signal combiner 13fq through the transmission signal changer 40 and a sliding correlation value AC(q0,Nr) in the reference reception antenna ANTs0 (which will be described later) based on the timing information given from the timing controller 21 for indicating the completion of calculation of the sliding correlation value.

Here, a reception antenna q$_0$ which is one of the four reception antennas ANT1 to ANT4 shown in FIG. 11 and which includes a signal combiner 13fq$_0$ as a reference for calculating a phase shift quantity is referred to as reference reception antenna. Assume further that the sliding correlation value AC(q$_0$,Nr) in the reference reception antenna ANTq$_0$ and the sliding correlation value AC(q,Nr) in the reception antenna ANTq have been already calculated by the correlation value calculator 20.

The phase shift quantity calculator 22 calculates a phase shift quantity Δθ(q) in the reception antenna ANTq in accordance with the expression (10) based on the sliding correlation value AC(q,Nr) in the reception antenna ANTq and the sliding correlation value AC(q$_0$,Nr) in the reference reception antenna ANTq$_0$. The phase shift quantity calculator 22 outputs the calculated phase shift quantity Δθ(q) to the phase corrector 23.

[Expression 10]

$$\Delta\theta(q)=\angle[AC(q,Nr)AC^*(q_0,Nr)] \quad (10)$$

In the expression (10), each of the parameter q and the parameter q$_0$ shows a natural number not larger than the number of reception antennas. Each of the parameters s and s$_0$ shows any one of 1, 2, 3 and 4. The asterisk (*) shows a complex conjugate operator.

The phase corrector 23 corrects the phase component of the sliding correlation value AC(q,k) in the reception antenna ANTq calculated by the correlation value calculator 20 in accordance with the expression (11) based on the phase shift quantity output from the phase shift quantity calculator 22.

[Expression 11]

$$\angle[AC(q,k)]-\angle\theta(q)-\phi_q \quad (11)$$

The phase corrector 23 stores the sliding correlation value (see the expression (12)) having the corrected phase component in the reception antenna ANTq at discrete time of k=2Nr to (Nr+Nu) in the storage 24 based on the timing information output from the timing controller 21 for indicating that the corrected sliding correlation value is stored.

[Expression 12]

$$|AC(q,k)|\exp(j\{\angle[AC(q,k)]-\Delta\theta(q)-\phi_q\}) \quad (12)$$

The arrival angle and distance estimator 25 performs calculation to estimate the arrival angle of the target and the distance to the target based on the sliding correlation value AC(q,k) having the corrected phase component in each reception antenna ANTq stored in the storage 24. The calculation to estimate the arrival angle by the arrival angle and distance estimator 25 is a technique which has become publicly known. For example, this technique can be achieved by referring to Non-Patent Literature 2 which has been described above. Moreover, the calculation to estimate the distance to the target by the arrival angle and distance estimator 25 can be achieved by referring to Reference Non-Patent Literature 1 which has described above.

For example, the arrival angle and distance estimator 25 calculates reception signal power in the reception antenna based on the correlation value having the corrected phase component in the reception antenna ANTq with respect to the arrival angle of the target. The reception signal power includes the phase component at the arrival angle of the target. The arrival angle and distance estimator 25 estimates the angle of the phase component in the case where the reception signal power takes a maximum value, as the arrival angle of the target.

For example, the arrival angle and distance estimator 25 estimates the distance to the target based on the time difference between the discrete time in the case where the correlation value takes a maximum value and the transmission time of the high-frequency transmission signal based on the correlation value having the corrected phase component in the reception antenna ANTq with respect to the distance to the target.

As described above, in accordance with the radar device 1f according to the third embodiment, a phase shift quantity of a phase component in a correlation value between a reception signal received by each of reception antennas and a transmission signal can be calculated properly as measurement performance of the radar device while, for example, influence on the measurement time or measurement distance range is suppressed.

Moreover, the radar device 1f can correct the phase component of the correlation value in each reception antenna ANTq based on the properly calculated phase shift quantity to thereby suppress deterioration of accuracy of measurement of the arrival angle of the target and the distance to the target.

Moreover, in accordance with the radar device 1f, because the transmission signal for calibration is the same as the transmission signal for measurement, execution can be made without addition of any correlation calculator for calibration to the signal processor 17, so that execution can be made without complication of circuit configuration.

Although the phase shifter 42-q in the third embodiment gives phase rotation to the baseband signal which is the output of the RF receiver 14fq, the third embodiment is not limited thereto. The same effect can be obtained even in a configuration that phase rotation is given to a high-frequency signal or an intermediate-frequency signal obtained in the RF receiver 14fq. Or the same effect can be obtained even in a configuration that phase rotation is given to a signal of the oscillator Lo input to the RF receiver 14fq.

Figure 13:
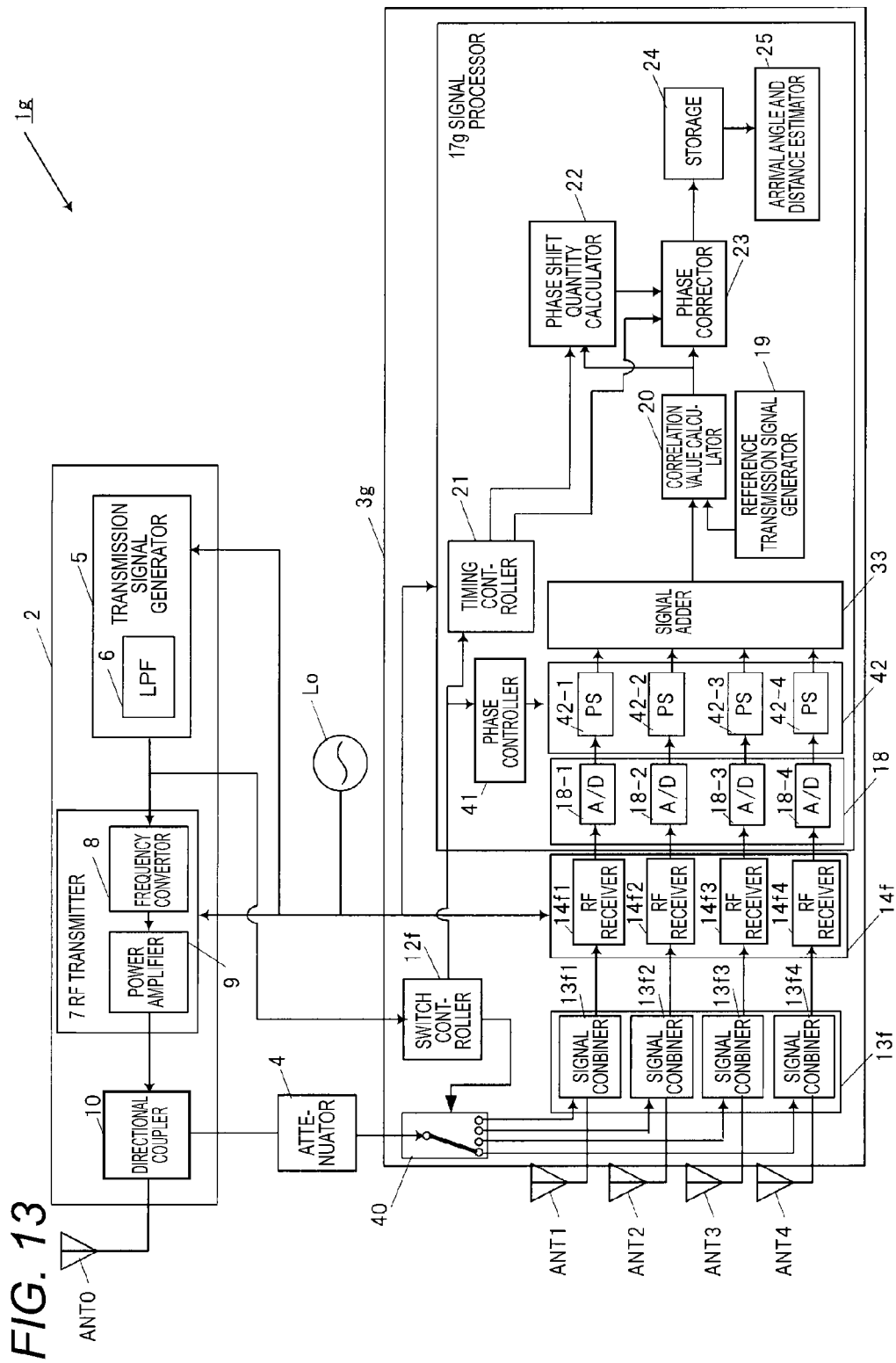
[FIG. 13] A block diagram illustrating the internal configuration of a radar device according to Modification 1 of the third embodiment.

Although the phase shifter 42 in the third embodiment analogically gives phase rotation to the baseband signal which is the output of the RF receiver 14fq, the third embodiment is not limited thereto. FIG. 13 is a block diagram illustrating the internal configuration of a radar device 1g according to Modification 1 of the third embodiment.

For example, a radar receiver 3g shown in FIG. 13 uses ND converters 18-1 to 18-4 for converting baseband signals obtained in RF receivers 14f1 to 14f4 into discretely sampled digital signals respectively. Moreover, in the radar receiver 3g, phase shifters 42-1 to 42-4 give phase rotations to the discretely sampled digital signals respectively. Moreover, the signal adder 33 adds the outputs of the phase shifters 42 in the same manner as in the radar device 1f according to the third embodiment.

By the configuration, the same effect as in the radar device 1f according to the third embodiment can be obtained in the radar device 1g. In Modification 1 of the third embodiment, a larger number of ND converters are required but digital phase control can be given to obtain higher accuracy than analog phase control.

Although various embodiments have been described with reference to the accompanying drawings, it is a matter of course that the radar device according to the invention is not limited to the examples. It is obvious that various changes or modifications can be thought of in the category described in the scope of claim by those skilled in the art, and it is to be understood that those are included in the technical scope of the invention.

Incidentally, in the invention, when the average reception signal power in the reception antenna ANTs varies widely in the case where the reception antenna ANTs is changed in accordance with the measurement environment around the radar device 1 or the like, the attenuator 4 may change its attenuation quantity in accordance with the average reception signal power.

Incidentally, this application is based on Japanese Patent Application (Patent Application 2010-161799) filed on Jul. 16, 2010 and the contents of which are incorporated herein by reference.

INDUSTRIAL APPLICABILITY

The radar device according to the invention is useful as an array radar device in which phase shift quantities in a plurality of antennas are corrected properly without influence on a measurement time or measurement distance range so that deterioration of accuracy of estimation of the arrival angle of a target is suppressed.

REFERENCE SIGNS LIST 1, 1a, 1b, 1c, 1d, 1e, 1f, 1g radar device
2 radar transmitter
3, 3a, 3b, 3c, 3d, 3e, 3f, 3g radar receiver
4 attenuator
5 transmission signal generator
6 LPF
7 RF transmitter
8, 16, 28 frequency converter
9, 15, 27 power amplifier
10 directional coupler
11, 11a, 11b switch
12, 12c, 12e, 12f switch controller
13, 13a, 13a1, 13a2, 13a3, 13a4, 13b1, 13b2, 13b3, 13b4 signal combiner
14, 14a, 14a1, 14a2, 14a3, 14a4, 14b1, 14b2, 14b3, 14b4, 14f1, 14f2, 14f3, 14f4 RF receiver
17, 17a, 17d, 17e signal processor
18, 18-1, 18-2, 18-3, 18-4 ND convertor
19 reference transmission signal generator
20 correlation value calculator
21 timing controller
22 phase shift quantity calculator
23 phase corrector
24 storage
25 arrival angle and distance estimator
29, 31 second switch
30 intersystem fixed phase error storage
32-1, 32-2, 32-3, 32-4 phase shifter
33 signal adder
40 transmission signal changer
41 phase controller
42 phase shifter
ANT0 transmission antenna
ANT1 to ANT4 reception antenna
Lo oscillator

The invention claimed is:

1. A radar device for transmitting a high-frequency transmission signal intermittently in a transmission cycle having a predetermined transmission period and a non-transmission period, receiving a signal reflected by a target by using a plurality of reception antennas, and detecting the target based on the reflected signal, the radar device comprising:

a transmission signal generator which generates a transmission signal in baseband;

a RF transmitter which converts the transmission signal generated by the transmission signal generator into a high-frequency transmission signal;

a directional coupler which distributes the high-frequency transmission signal converted by the RF transmitter in accordance with a predetermined signal power ratio;

a level adjuster which adjusts the high-frequency transmission signal distributed by the directional coupler to a predetermined level;

a signal combiner which combines a signal output from the level adjuster and a reception signal received by the reception antennas;

a RF receiver which converts the signal combined by the signal combiner into a reception signal in the baseband;

a reference transmission signal generator which generates a reference transmission signal the same as the transmission signal generated by the transmission signal generator;

a correlation value calculator which calculates a correlation value between the reference transmission signal generated by the reference transmission signal generator and the reception signal converted by the RF receiver;

a phase shift quantity calculator which calculates a phase shift quantity in arbitrary one of the reception antennas based on the correlation value in a reference reception antenna which is specific one of the reception antennas and the correlation value in any one of the other reception antennas; and a phase corrector which corrects a phase component of the correlation value in the arbitrary reception antenna based on the phase shift quantity calculated by the phase shift quantity calculator.

2. The radar device according to claim 1, further comprising:

a first switch which changes the reception antennas sequentially and selects a single reception antenna from the reception antennas, wherein the signal combiner combines the signal output from the level adjuster and a reception signal received by the single reception antenna selected by the first switch in the transmission period.

3. The radar device according to claim 2, further comprising:

a switch controller which controls the first switch in sync with the transmission cycle of the transmission signal generated by the transmission signal generator.

4. The radar device according to claim 3, wherein the level adjuster attenuates the high-frequency transmission signal output from the directional coupler to such a degree that the high-frequency transmission signal becomes sufficiently higher than the reception signal in the transmission period.

5. The radar device according to claim 3, further comprising:

an A/D converter which converts the reception signal converted by the RF receiver into digital data.

6. The radar device according to claim 3, further comprising:

a timing controller which notifies of a timing of completion of changing of the reception antennas by the switch controller through the first switch, wherein the phase shift quantity calculator calculates a phase shift quantity in any one of the other reception antennas based on the correlation value in the reference reception antenna and the correlation value in any one of the other reception antennas calculated by the correction value calculator based on the notification of the timing by the timing controller.

7. The radar device according to claim 6, further comprising:

a storage which stores the correlation value having the phase component corrected by the phase corrector with respect to each of the reception antennas; and an arrival angle and distance estimator which calculates an arrival angle of the target and a distance to the target based on the correlation value stored in the storage.

8. The radar device according to claim 7, further comprising:

a second switch which switches whether inputting of the high-frequency transmission signal attenuated by the level adjuster to the signal combiner is blocked or not, wherein the reception signal received by each of the reception antennas includes a crosstalk signal that is the transmitted high-frequency transmission signal coming to each of the reception antennas;

wherein the correlation value calculator calculates the correlation value in each of the reception antennas in the timing of arrival of the crosstalk signal due to blocking inputting of the attenuated high-frequency transmission signal to the signal combiner by the second switch; and wherein the phase shift quantity calculator calculates intersystem phase error from each of the reception antennas to the first switch based on the phase component of the correlation value calculated by the correlation value calculator in the timing of arrival of the crosstalk signal and the phase shift quantity in each of the reception antennas in the timing of completion of changing of the reception antennas.

9. The radar device according to claim 8, further comprising:

a reference phase storage which stores the intersystem phase error calculated by the phase shift quantity calculator as a reference phase value with respect to each of the reception antennas, wherein the correlation value calculator calculates the correlation value in each of the reception antennas in the timing of arrival of the crosstalk signal which comes to the reception antenna;

wherein the phase shift quantity calculator calculates the phase shift quantity in the reception antenna based on the phase component of the correlation value in the reception antenna in the timing of arrival of the crosstalk signal and the reference phase value stored in the reference phase storage; and wherein the phase corrector corrects the phase component of the correlation value in the reception antenna calculated by the correlation value calculator based on the phase shift quantity calculated by the phase shift quantity calculator.

10. The radar device according to claim 6, further comprising:

a second switch which switches whether inputting of the high-frequency transmission signal attenuated by the level adjuster to the signal combiner is blocked or not, wherein the switch controller controls the second switch so that whether inputting of the high-frequency transmission signal to the signal combiner is blocked or not, is switched in accordance with a cycle of sequentially changing the reception antennas.

11. The radar device according to claim 6, further comprising:

an intersystem fixed phase error storage which stores intersystem fixed phase error from each of the reception antennas to the first switch, wherein the phase shift quantity calculator corrects the phase shift quantity in any one of the other reception antennas inclusive of the intersystem fixed phase error stored in the intersystem fixed phase error storage.

12. The radar device according to claim 2, further comprising:

a switch controller which controls the transmission signal changer to change the signal combiner units sequentially in sync with the transmission cycle of the transmission signal generated by the transmission signal generator.

13. The radar device according to claim 1, wherein the signal combiner includes a plurality of signal combiner units each of which combines the signal output from the level adjuster and a reception signal received by corresponding one of the reception antennas; and the radar device further comprising:

a transmission signal changer which selects one of the signal combiner units and inputs the signal output from the level adjuster to the selected signal combining unit.

* * * * *